(12) United States Patent
Kato

(10) Patent No.: US 10,262,252 B2
(45) Date of Patent: *Apr. 16, 2019

(54) WIRELESS COMMUNICATION DEVICE AND ARTICLE EQUIPPED WITH THE SAME

(71) Applicant: Murata Manufacturing Co., Ltd., Nagaokakyo-shi, Kyoto-fu (JP)

(72) Inventor: Noboru Kato, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/869,448

(22) Filed: Jan. 12, 2018

(65) Prior Publication Data

US 2018/0144225 A1 May 24, 2018

Related U.S. Application Data

(63) Continuation of application No. PCT/JP2016/070862, filed on Jul. 14, 2016.

(30) Foreign Application Priority Data

Jul. 21, 2015 (JP) .................................. 2015-143881
Feb. 25, 2016 (JP) .................................. 2016-034658
Apr. 15, 2016 (JP) .................................. 2016-081802

(51) Int. Cl.
*G06K 19/06* (2006.01)
*G06K 19/077* (2006.01)
(Continued)

(52) U.S. Cl.
CPC ......... *G06K 19/077* (2013.01); *H01Q 1/2225* (2013.01); *H01Q 1/38* (2013.01);
(Continued)

(58) Field of Classification Search
CPC ......... G06K 19/07749; G06K 19/0723; H01Q 1/2225
(Continued)

(56) References Cited

U.S. PATENT DOCUMENTS 6,018,299 A   1/2000  Eberhardt
6,588,672 B1* 7/2003  Usami ................. G06K 19/073
                                                235/379

(Continued)

FOREIGN PATENT DOCUMENTS

JP   2002-519771 A   7/2002
JP   2005-191705 A   7/2005
(Continued)

OTHER PUBLICATIONS

International Search Report issued in International Application No. PCT/JP2016/070861, dated Aug. 30, 2016.

(Continued)

*Primary Examiner* — Jamara A Franklin
(74) *Attorney, Agent, or Firm* — Arent Fox LLP

(57) ABSTRACT

A wireless communication device is provided that has a dielectric member attached to a metal surface of an article, an RFIC element including first and second terminal electrodes, a first radiation electrode disposed on the dielectric member in parallel with and oppositely to the metal surface of the article at a predetermined distance and connected to the first terminal electrode of the RFIC element, and a second radiation electrode disposed on the dielectric member in parallel with and oppositely to the metal surface of the article at the predetermined distance and connected to the second terminal electrode of the RFIC element independently of the first radiation electrode. The first and second radiation electrodes extend in respective directions intersecting with each other, with the first radiation electrode having (Continued)

a smaller width and a shorter length in an extending direction than the second radiation electrode.

20 Claims, 22 Drawing Sheets

(51) Int. Cl.
*H01Q 1/38* (2006.01)
*H01Q 9/04* (2006.01)
*H01Q 9/28* (2006.01)
*H01Q 1/22* (2006.01)
*H01Q 9/26* (2006.01)

(52) U.S. Cl.
CPC ............ *H01Q 9/0485* (2013.01); *H01Q 9/26* (2013.01); *H01Q 9/285* (2013.01)

(58) Field of Classification Search
USPC .......................................................... 235/492
See application file for complete search history.

(56) References Cited

U.S. PATENT DOCUMENTS

| | | | |
|---|---|---|---|
| 7,911,404 | B2 | 3/2011 | Yamagajo et al. |
| 8,232,923 | B2 | 7/2012 | Yang |
| 8,397,994 | B2 | 3/2013 | Kai et al. |
| 8,991,713 | B2 | 3/2015 | Dokai et al. |
| 8,994,605 | B2 | 3/2015 | Kato |
| 9,117,157 | B2 | 8/2015 | Kato |
| 9,123,996 | B2 | 9/2015 | Dokai et al. |
| 2006/0032926 | A1 | 2/2006 | Baba et al. |
| 2008/0042848 | A1 | 2/2008 | Roberts et al. |
| 2008/0122628 | A1 | 5/2008 | Kai et al. |
| 2008/0122629 | A1 | 5/2008 | Yamagajo et al. |
| 2008/0150726 | A1 | 6/2008 | Yamagajo et al. |
| 2008/0231458 | A1 | 9/2008 | Fein |
| 2009/0079568 | A1 | 3/2009 | Forster et al. |
| 2009/0305635 | A1 | 12/2009 | Osamura et al. |
| 2010/0066636 | A1 | 3/2010 | Carr |
| 2011/0080331 | A1 | 4/2011 | Kato |
| 2011/0279326 | A1 | 11/2011 | Dokai et al. |
| 2011/0284641 | A1 | 11/2011 | Yang |
| 2013/0050047 | A1 | 2/2013 | Carr |
| 2013/0200162 | A1 | 8/2013 | Dokai et al. |
| 2014/0131457 | A1 | 5/2014 | Kato |
| 2015/0364831 | A1 | 12/2015 | Li et al. |

FOREIGN PATENT DOCUMENTS

| | | |
|---|---|---|
| JP | 2006-222873 A | 8/2006 |
| JP | 2009-26044 A | 2/2009 |
| JP | 2010-74809 A | 4/2010 |
| JP | 2011-9840 A | 1/2011 |
| JP | 2011-13795 A | 1/2011 |
| JP | 2011-76567 A | 4/2011 |
| JP | 2012-1379894 A | 7/2012 |
| JP | 2012-146000 A | 8/2012 |
| JP | 5170156 B2 | 3/2013 |
| JP | 2014-143591 A | 8/2014 |
| JP | 2014-220739 A | 11/2014 |
| WO | WO 2006/134658 A1 | 12/2006 |
| WO | WO 2007/000807 A1 | 1/2007 |
| WO | WO 2007/029296 A1 | 3/2007 |
| WO | WO 2008/096574 A1 | 8/2008 |
| WO | WO 2012/096365 A1 | 7/2012 |

OTHER PUBLICATIONS

International Search Report issued in International Application No. PCT/JP2016/070862, dated Sep. 13, 2016.
Written Opinion of the International Searching Authority issued in International Application No. PCT/JP2016/070861, dated Aug. 30, 2016.
Written Opinion of the International Searching Authority issued in International Application No. PCT/JP2016/070862, dated Sep. 13, 2016.

* cited by examiner

WIRELESS COMMUNICATION DEVICE AND ARTICLE EQUIPPED WITH THE SAME

CROSS REFERENCE TO RELATED APPLICATIONS

The present application is a continuation of PCT/JP2016/070862 filed Jul. 14, 2016, which claims priority to Japanese Patent Application No. 2016-081802, filed Apr. 15, 2016, Japanese Patent Application No. 2016-034658, filed Feb. 25, 2016, and Japanese Patent Application No. 2015-143881, filed Jul. 21, 2015, the entire contents of each of which are incorporated herein by reference.

TECHNICAL FIELD

The present disclosure relates to a wireless communication device, more particularly, to a wireless communication device capable of wireless communication even when attached to a metal surface of an article, and an article equipped with the same.

BACKGROUND

Wireless communication devices capable of wireless communication even when attached to a metal surface of an article include a device described in Patent Document 1 (identified below), for example.

The wireless communication device described in Patent Document 1 is formed by winding a belt-shaped metal member such as an aluminum foil around a rectangular-parallelepiped dielectric member. As a result, radiators are disposed on an upper surface and a lower surface of the dielectric member. The wireless communication device is attached to a metal surface of an article such that the radiator on the lower surface side of the dielectric member faces the metal surface of the article. Due to such a structure, even when the device is attached to the metal surface of the article, a stray capacitance between the radiator on the upper surface side and the radiator on the lower surface side of the dielectric member are substantially unchanged from before attachment to the article. Therefore, even when it is attached to a metal surface of an article, the wireless communication device can perform wireless communication in the same way as if it is not attached to the article.

Patent Document 1: Japanese Laid-Open Patent Publication No. 2012-146000.

However, it is difficult to reduce thickness in designs, such as the wireless communication device described in Patent Document 1. If the thickness of the dielectric member is reduced to make the device thinner, a distance between the radiator on the upper surface side and the radiator on the lower surface side becomes small, and the stray capacitance increases therebetween. Moreover, when the stray capacitance increases, a large amount of a current flowing through the radiator is consumed for electric field formation in the stray capacitance, and consequently, the radiation efficiency of radio waves from the radiator deteriorates. Therefore, the communication distance of the wireless communication device becomes shorter.

SUMMARY OF THE INVENTION

Therefore, the object of the present disclosure is to reduce a thickness of a wireless communication device capable of wireless communication even when it is attached to a metal surface of an article, while also suppressing a reduction in communicable distance.

Thus, according to an exemplary aspect of the present disclosure, a wireless communication device is provided that can be used when it is attached to a metal surface of an article. In an exemplary embodiment, the wireless communication device includes a dielectric member including an attachment surface attached to the metal surface of the article; an RFIC element disposed on the dielectric member and including first and second terminal electrodes; a first radiation electrode disposed on the dielectric member in parallel with and oppositely to the metal surface of the article at a predetermined distance and connected to the first terminal electrode of the RFIC element; and a second radiation electrode disposed on the dielectric member in parallel with and oppositely to the metal surface of the article at the predetermined distance and connected to the second terminal electrode of the RFIC element independently of the first radiation electrode. Moreover, the first and second radiation electrodes extend in respective directions intersecting with each other, and the first radiation electrode has a smaller width and a shorter length in an extending direction as compared to the second radiation electrode.

According to further exemplary aspect, an article is provided at least partially having a metal surface and including a wireless communication device attached to the metal surface. In addition, the wireless communication device includes a dielectric member including an attachment surface attached to the metal surface of the article, an RFIC element disposed on the dielectric member and including first and second terminal electrodes; a first radiation electrode disposed on the dielectric member in parallel with and oppositely to the metal surface of the article at a predetermined distance and connected to the first terminal electrode of the RFIC element; and a second radiation electrode disposed on the dielectric member in parallel with and oppositely to the metal surface of the article at the predetermined distance and connected to the second terminal electrode of the RFIC element independently of the first radiation electrode. Furthermore, the first and second radiation electrodes extend in respective directions intersecting with each other, and the first radiation electrode has a smaller width and a shorter length in an extending direction as compared to the second radiation electrode.

The exemplary embodiments described herein make it possible to reduce the thickness of the wireless communication device capable of wireless communication even when it is attached to a metal surface of an article, while also suppressing a reduction in communicable distance.

DETAILED DESCRIPTION OF EXEMPLARY EMBODIMENTS

Figure 1:
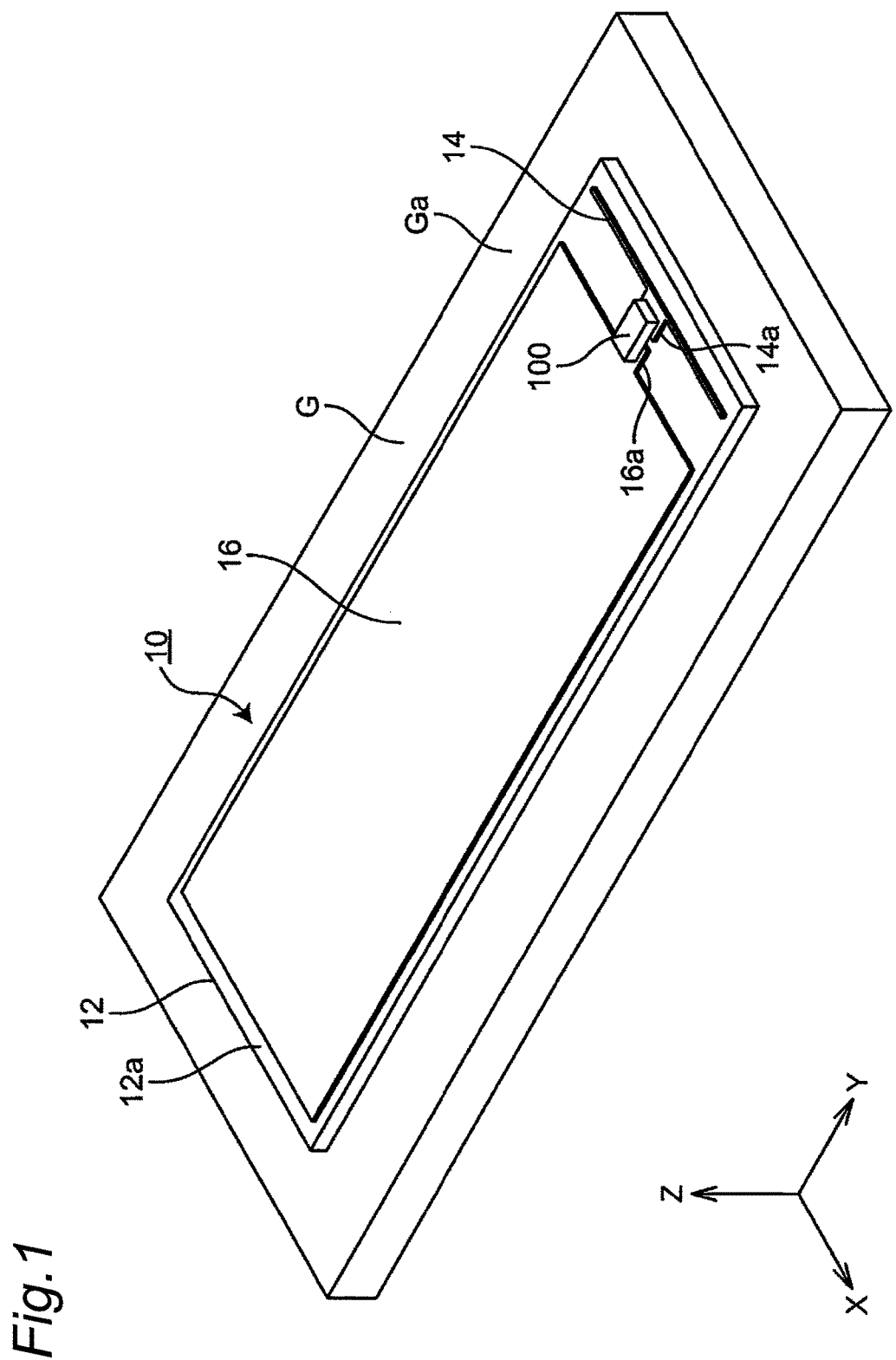
FIG. 1 is a perspective view of a wireless communication device according to an exemplary embodiment attached to an article.

A wireless communication device is disclosed according to an exemplary aspect that is can be used when it is attached to a metal surface of an article and has a dielectric member including an attachment surface attached to the metal surface of the article. Moreover, an RFIC element is disposed on the dielectric member and includes first and second terminal electrodes, a first radiation electrode is disposed on the dielectric member in parallel with and oppositely to the metal surface of the article at a predetermined distance and connected to the first terminal electrode of the RFIC element, and a second radiation electrode is disposed on the dielectric member in parallel with and oppositely to the metal surface of the article at the predetermined distance and connected to the second terminal electrode of the RFIC element independently of the first radiation electrode. In addition, the first and second radiation electrodes extend in respective directions intersecting with each other, and the first radiation electrode has a smaller width and a shorter length in an extending direction as compared to the second radiation electrode.

The exemplary aspect makes it possible to reduce the thickness of the wireless communication device capable of wireless communication even when attached to a metal surface of an article, while also suppressing a reduction in communicable distance.

In an exemplary aspect, the wireless communication device may have a conductive layer disposed on the attachment surface of the dielectric member independently of the first and second radiation electrodes. As a result, the wireless communication device can exhibit uniform communication characteristics regardless of a surface shape of the metal surface of the article to which the device is attached.

In an exemplary aspect, the length of the first radiation electrode in the extending direction may be equal to a width of the second radiation electrode. As a result, the wireless communication device can be made compact in size.

Moreover, the second radiation electrode may include a current concentration portion in which an area of a cross section orthogonal to the extending direction is smaller than the other portions. As a result, the second radiation electrode can be shortened while achieving a sufficient communication distance, and consequently, the wireless communication device can be made compact in size.

Furthermore, the second radiation electrode may include a first notch disposed at one end in a width direction and extending toward a center in the width direction. As a result, the communication frequency band of the wireless communication device can be expanded.

In addition to the first notch, the second radiation electrode may have a second notch disposed at the other end in the width direction and extending toward the center in the width direction, and the first notch and the second notch may be arranged at interval in the extending direction of the second radiation electrode. As a result, the communication frequency band of the wireless communication device can be expanded.

When the RFIC element includes a first coil connected to the first terminal electrode and a second coil connected to the second terminal electrode, and the first terminal electrode may include a land connected to the first terminal electrode of the RFIC element while the second terminal electrode may include a land connected to the second terminal electrode of the RFIC element, preferably, the RFIC element, the first radiation electrode, and the second radiation electrode are connected such that the land of the first radiation electrode is disposed between the first coil of the RFIC element and the attachment surface of the dielectric member and such that the land of the second radiation electrode is present between the second coil of the RFIC element and the attachment surface of the dielectric member. As a result, the first and second coils of the RFIC element are less affected by the potential of the metal surface of the article, and the first and second coils can stably function.

The dielectric member may include recesses at positions facing corner portions of the first and second radiation electrodes. As a result, at the corner portions where a current concentrates, the stray capacitance between the corner portions and the metal surface of the article becomes smaller, i.e., the current consumed for electric field formation in the stray capacitance is reduced. Consequently, the radiation efficiency of the first and second radiation electrodes increases and the communication distance of the wireless communication device becomes longer.

The predetermined distance may be 0.2 mm or more and 1 mm or less.

An article according to further exemplary aspect at least partially having a metal surface and including a wireless communication device attached to the metal surface. The wireless communication device has a dielectric member including an attachment surface attached to the metal surface of the article, an RFIC element disposed on the dielectric member and including first and second terminal electrodes, a first radiation electrode disposed on the dielectric member in parallel with and oppositely to the metal surface of the article at a predetermined distance and connected to the first terminal electrode of the RFIC element, and a second radiation electrode disposed on the dielectric member in parallel with and oppositely to the metal surface of the article at the predetermined distance and connected to the second terminal electrode of the RFIC element independently of the first radiation electrode. The first and second radiation electrodes extend in respective directions intersecting with each other, and the first radiation electrode has a smaller width and a shorter length in an extending direction as compared to the second radiation electrode.

The exemplary aspect makes it possible to reduce the thickness of the wireless communication device capable of wireless communication even when attached to a metal surface of an article, while suppressing a reduction in communicable distance. Therefore, the article having the wireless communication device is also made thinner.

Exemplary embodiments of the present disclosure will now be described with reference to the drawings.

Figure 2:
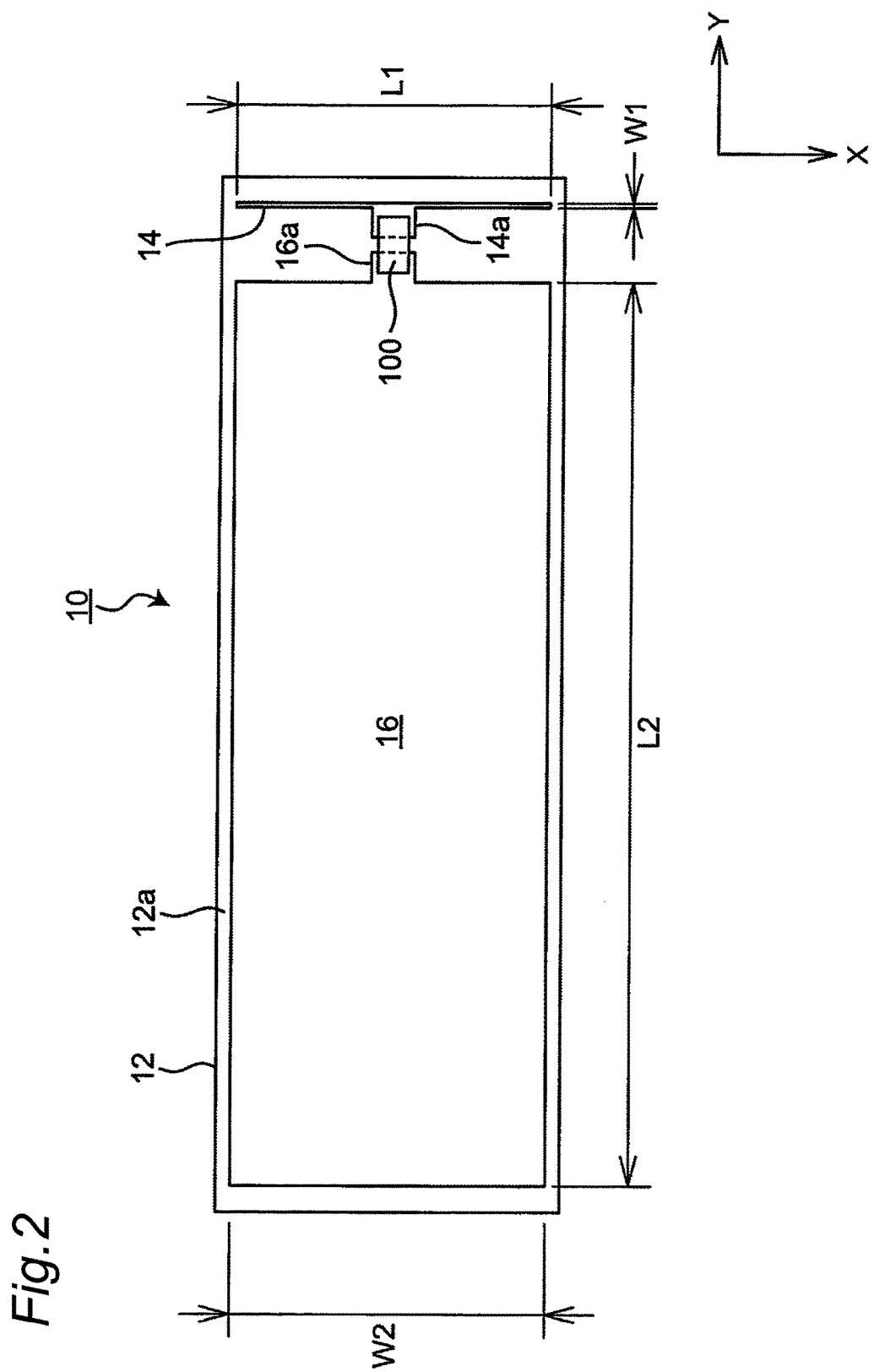
FIG. 2 is a top view of the wireless communication device shown in FIG. 1.
Figure 3:
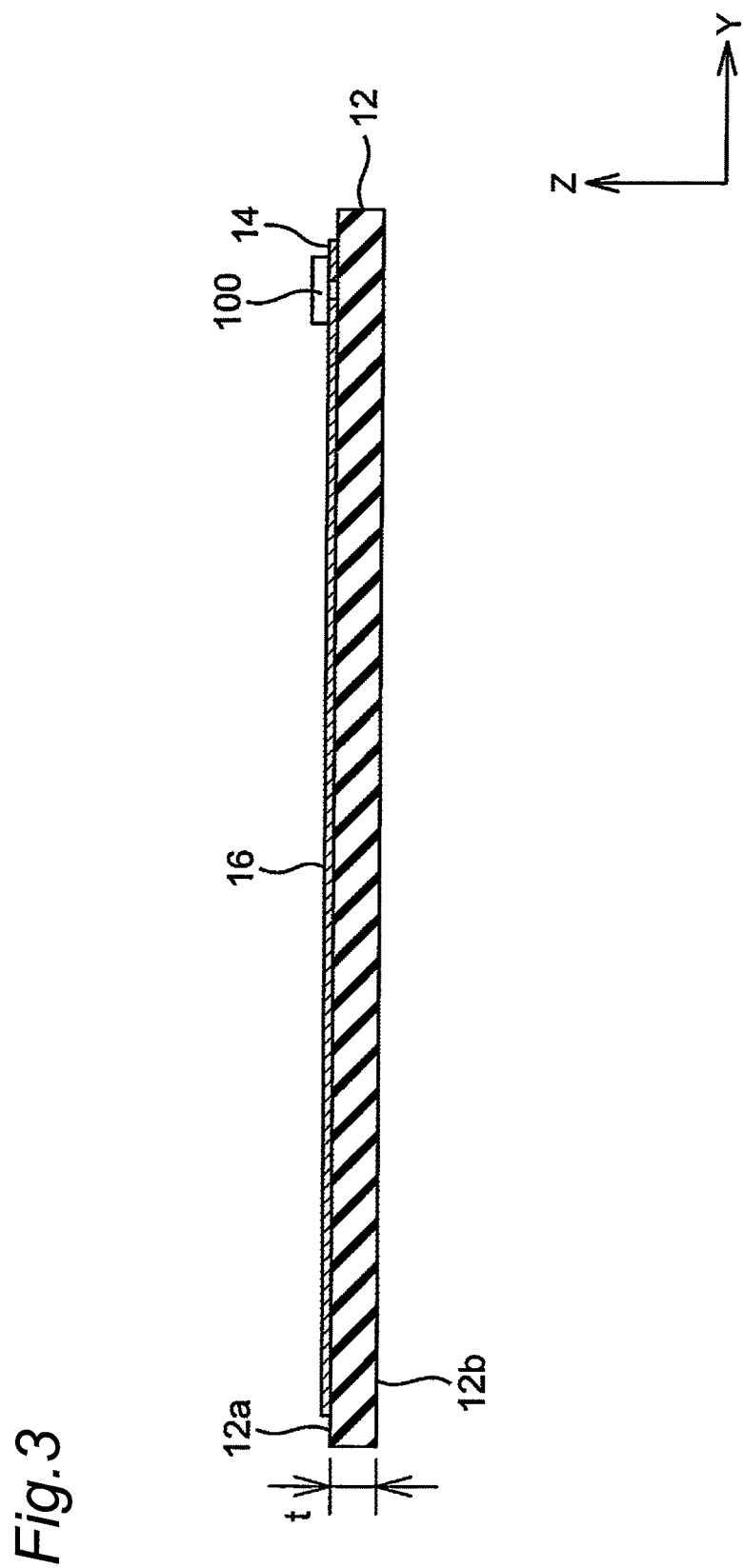
FIG. 3 is a cross-sectional view of the wireless communication device shown in FIG. 1.

FIG. 1 is a perspective view of a wireless communication device according to an exemplary embodiment attached to an article. FIG. 2 is a top view of the wireless communication device and FIG. 3 is a cross-sectional view of the wireless communication device. In the drawings, to facilitate understanding of the exemplary embodiments, an X-Y-Z coordinate system is shown, including X, Y, and Z axes orthogonal to each other. In this description, Z-, X-, and Y-axis directions are defined as a thickness direction, a width direction, and a length direction, respectively, of the wireless communication device 10.

As shown, a wireless communication device 10 is provided in FIG. 1 that is an RFID (Radio Frequency Identification) tag for performing wireless communication at a carrier frequency of the UHF band, for example, 900 MHz, and is configured to be attached to various articles before use. Although described in detail later, the wireless communication device 10 according to this exemplary embodiment is capable of wireless communication even when attached to a metal surface Ga of an article G (e.g., a metal body).

As shown in FIG. 1, the wireless communication device 10 has a dielectric member (dielectric substrate) 12 and first and second radiation electrodes 14, 16 disposed on a principal surface 12a of the dielectric substrate 12. The wireless communication device 10 also has an RFIC (Radio Frequency Integrated Circuit) element 100 disposed on the principal surface 12a of the dielectric substrate 12.

As shown in FIGS. 1 to 3, the dielectric substrate 12 of the exemplary wireless communication device 10 has a rectangular thin plate shape in planar view including the principal surface 12a and a back surface (attachment surface) 12b parallel and opposite to the principal surface 12a, and has a uniform thickness. Preferably, the dielectric substrate 12 is made of a dielectric material having a low permittivity (preferably a relative permittivity of 10 or less). The dielectric substrate 12 is made of a flexible dielectric material such as polyethylene terephthalate (PET), fluorine resin, urethane resin, and paper, for example. The dielectric substrate 12 may be made of a magnetic material.

As shown in FIG. 2, the first radiation electrode 14, the second radiation electrode 16, and the RFIC element 100 are disposed on the principal surface 12a side of the dielectric substrate 12. Moreover, there is no electrode or similar structure disposed on the attachment surface 12b as shown in FIG. 3 and functions as a means attached to the metal surface Ga of the article G as shown in FIG. 1. Furthermore, although not shown, a conductive seal layer for affixing the wireless communication device 10 to the article G is disposed on the attachment surface 12b of the dielectric substrate 12. With the dielectric substrate 12 as described above, the first and second radiation electrodes 14, 16 can be parallel and opposite to the metal surface Ga of the article G at a predetermined distance corresponding to the thickness of the dielectric substrate 12. Therefore, the dielectric substrate 12 serves as a bracket for disposing the first and second radiation electrodes 14, 16 at a distance from the metal surface Ga of the article G.

The first and second radiation electrodes 14, 16 are copper films or aluminum films, for example, and are made of a flexible and conductive material. In the case of this exemplary embodiment, the first and second radiation electrodes 14, 16 are in a rectangular shape having a longitudinal direction and a lateral direction.

The first and second radiation electrodes 14, 16 face each other in the length direction (Y-axis direction) of the wireless communication device 10. Specifically, the second radiation electrode 16 is independent of the first radiation electrode 14, i.e., separated at a distance from the first radiation electrode 14 in terms of shape and not directly connected to each other.

As shown in FIG. 2, the first radiation electrode 14 has a length L1 and a width W1 (L1>W1) and extends along the principal surface 12a in the width direction (X-axis direction) of the wireless communication device 10. Moreover, the second radiation electrode 16 has a length L2 and a width W2 (L2>W2) and extends along the principal surface 12a in the length direction (Y-axis direction) of the wireless communication device 10. Therefore, on the principal surface 12a, the first and second radiation electrodes 14, 16 extend in the directions intersecting with each other, for example, in the directions different by 90 degrees from each other.

The width W1 of the first radiation electrode 14 is smaller than the width W2 of the second radiation electrode 16. The length L1 (i.e., the length in the extending direction) of the first radiation electrode 14 is shorter than the length L2 of the second radiation electrode 16. Therefore, the size (size in top view) of the first radiation electrode 14 is smaller than the size of the second radiation electrode 16.

In this embodiment, the length L1 of the first radiation electrode 14 is substantially equal to the width W2 of the second radiation electrode 16. Therefore, the wireless communication device 10 can be made with a compact size in the width direction (X-axis direction).

Furthermore, although described later in detail, the first and second radiation electrodes 14, 16 include land portions 14a and 16a for connection to the RFIC element 100. The respective land portions 14a and 16a are disposed to face each other between the first and second radiation electrodes 14, 16.

Figure 4:
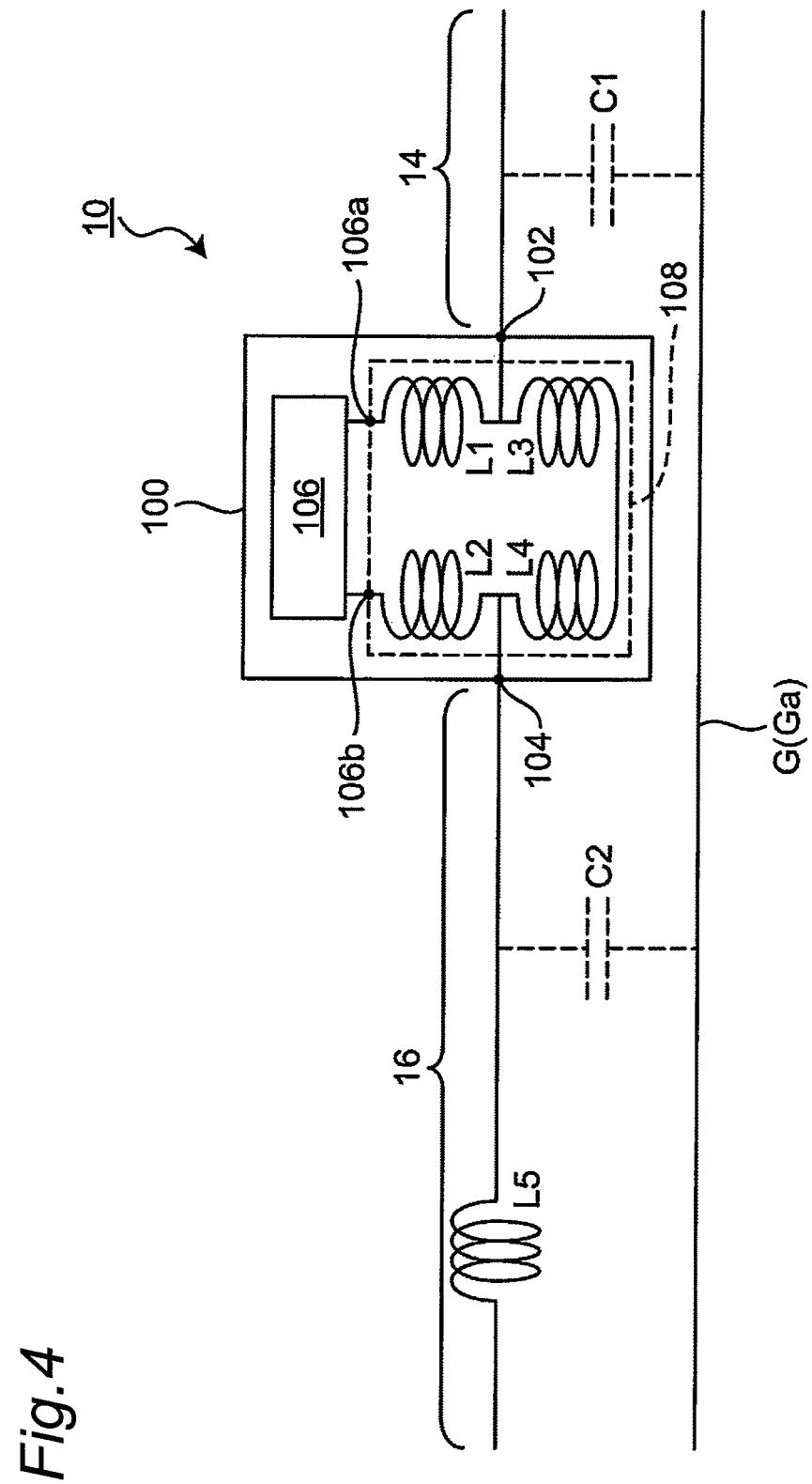
FIG. 4 is a diagram of an equivalent circuit of the wireless communication device shown in FIG. 1 attached to an article.

FIG. 4 shows an equivalent circuit of the wireless communication device 10 attached to the metal surface Ga of the article G.

As shown in FIG. 4, a stray capacitance C1 exists between the first radiation electrode 14 and a portion of the metal surface Ga of the article G (the portion opposite to the first radiation electrode 14).

A stray capacitance C2 exists between the second radiation electrode 16 and a portion of the metal surface Ga of the article G (the portion opposite to the second radiation electrode 16). This stray capacitance C2 and a parasitic inductor L5 of the second radiation electrode 16 forms a parallel resonance circuit having a predetermined frequency (e.g., 900 MHz) as the resonance frequency.

The RFIC element 100 will be described.

In particular, the RFIC device 100 shown in FIG. 4 is an RFIC device using a communication frequency of, for example, the 900 MHz band, i.e., the UHF band. The RFIC device 100 has flexibility be described in detail later. The RFIC device 100 has an RFIC chip 106 and a matching circuit 108 for impedance matching between the RFIC chip 106 and the first and second radiation electrodes 14, 16.

The RFIC chip 106 includes first and second input/output terminals 106a, 106b. The first input/output terminal 106a is connected to the first radiation electrode 14 via the matching circuit 108. The second input/output terminal 106b is connected to the second radiation electrode 16 via the matching circuit 108.

When the first and second radiation electrodes 14, 16 acting as an antenna receive a high-frequency signal from the outside, the RFIC chip 106 is activated in response to a supply of a current induced by the reception. The activated RFIC chip 106 generates a high-frequency signal and outputs the generated signal as a radio wave through the first and second radiation electrodes 14, 16 to the outside.

A specific configuration of the RFIC element 100 will hereinafter be described.

Figure 5:
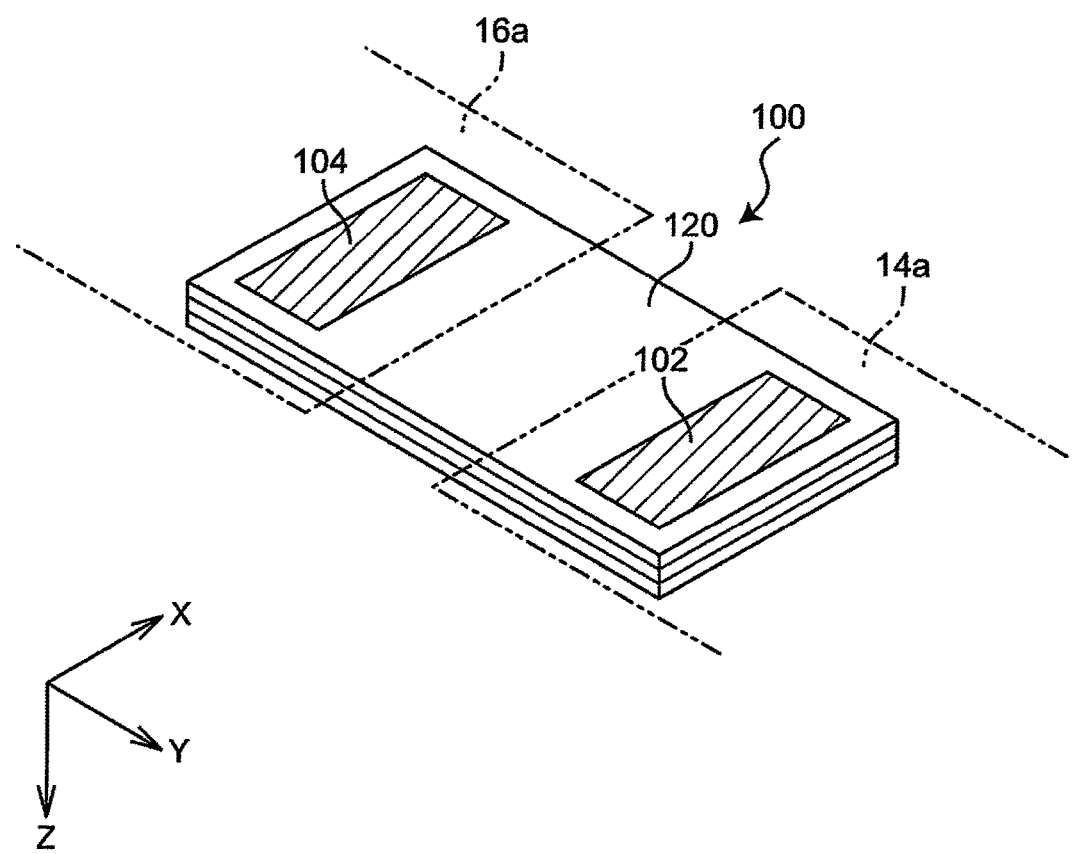
FIG. 5 is a perspective view of an RFIC element.

FIG. 5 is a perspective view of the RFIC element 100. In the case of this embodiment, the RFIC element 100 has a multilayer substrate 120 as an element substrate provided with the RFIC chip 106 and the matching circuit 108. The multilayer substrate 120 is formed by laminating multiple insulating layers having flexibility. For example, the multiple insulating layers are flexible resin insulating layers of polyimide or liquid crystal polymer.

Figure 6:
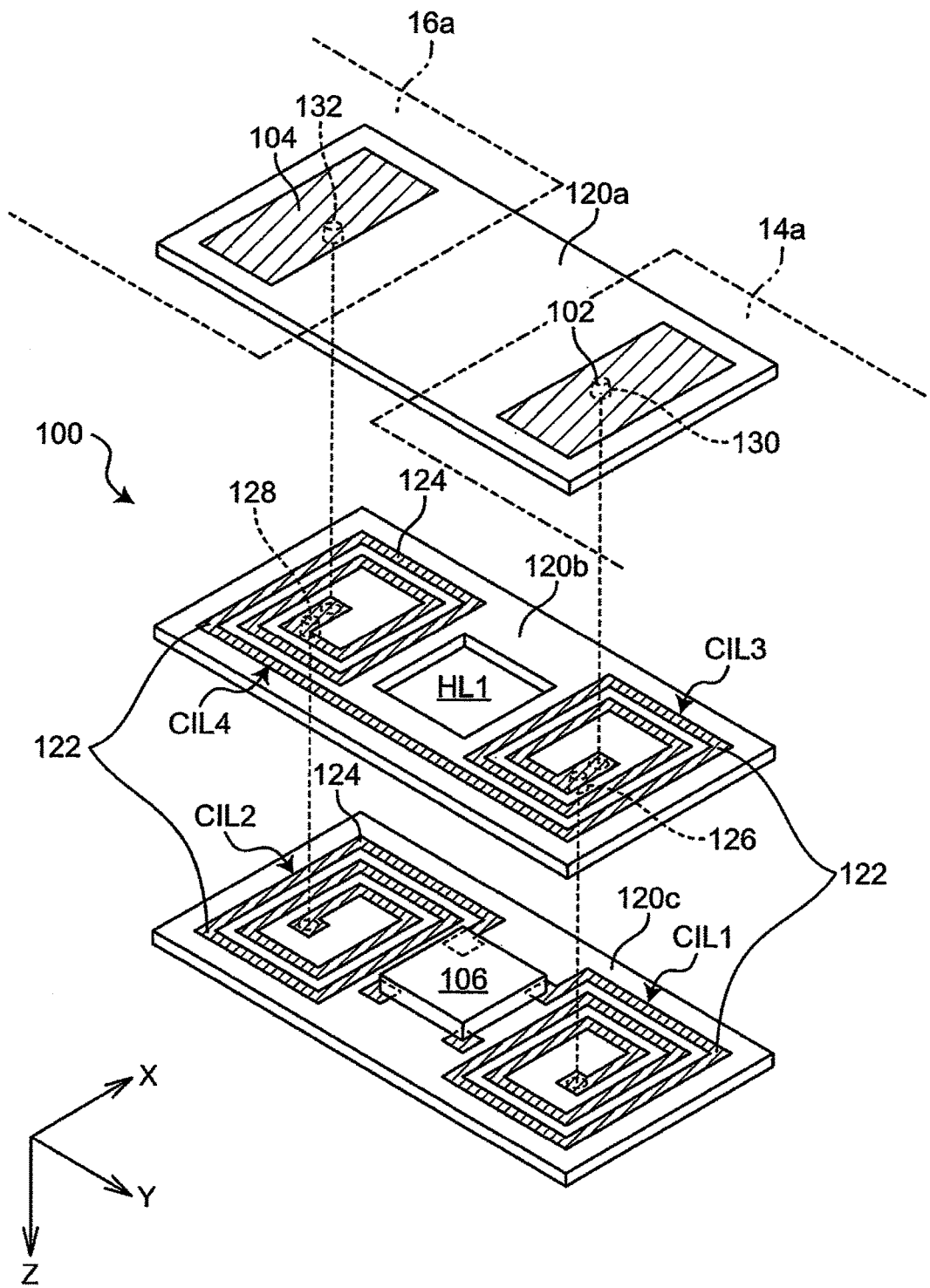
FIG. 6 is a perspective view of an internal structure of the RFIC element shown in FIG. 5.

FIG. 6 is a perspective view of an internal structure of the RFIC element shown in FIG. 5. In the following description, the side provided with the first and second terminal electrodes 102, 104, i.e., the side facing the dielectric substrate 12 in the wireless communication module 12, is assumed as the upper side of the RFIC element 100.

Figure 7A:
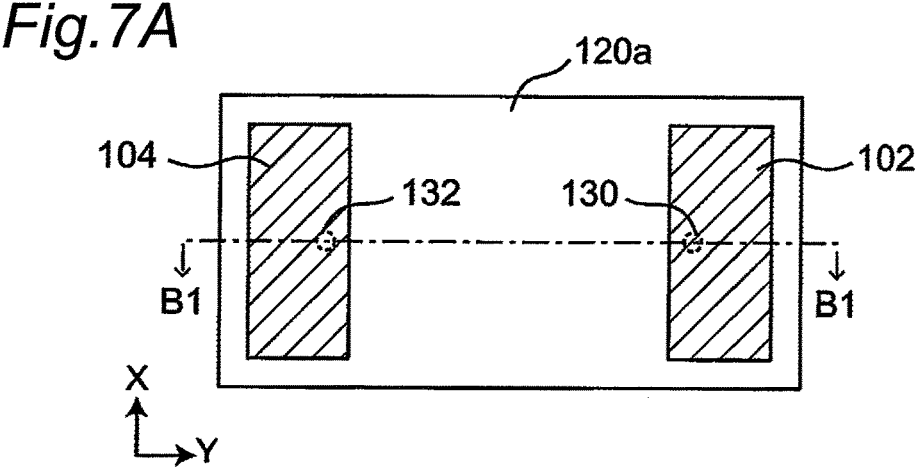
FIG. 7A is a top view of an upper insulating layer in the RFIC element configured as a multilayer substrate.
Figure 7B:
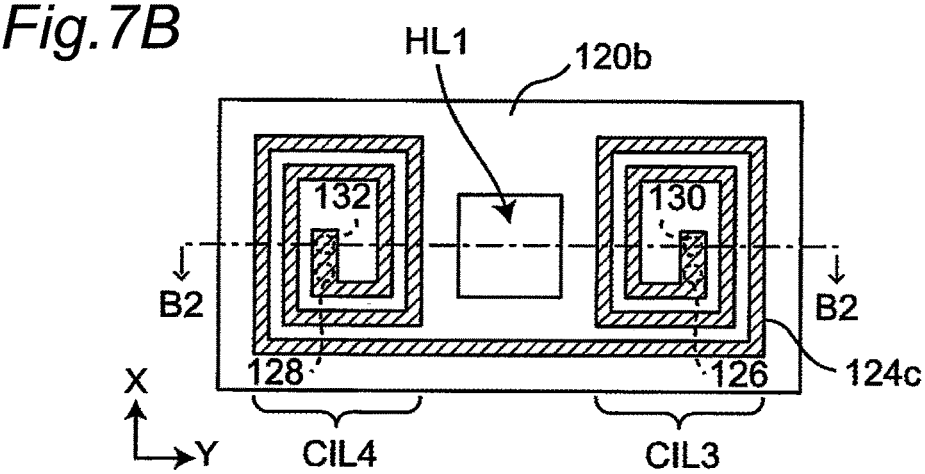
FIG. 7B is a top view of a middle insulating layer in the RFIC element.
Figure 7C:
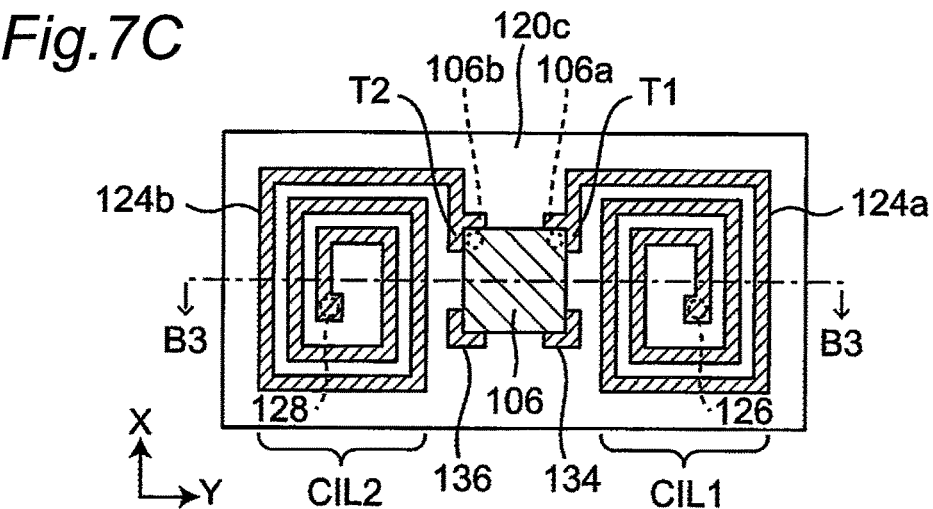
FIG. 7C is a top view of a lower insulating layer in the RFIC element.
Figure 8A:
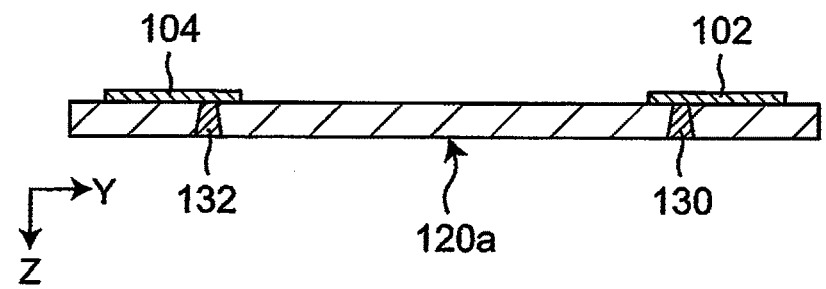
FIG. 8A is a cross-sectional view of the upper insulating layer taken along a line B1-B1 shown in FIG. 7A.
Figure 8B:
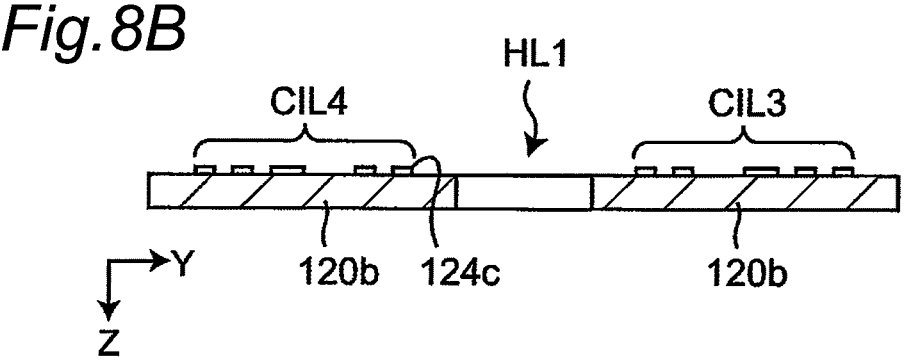
FIG. 8B is a cross-sectional view of the center insulating layer taken along a line B2-B2 shown in FIG. 7B.
Figure 8C:
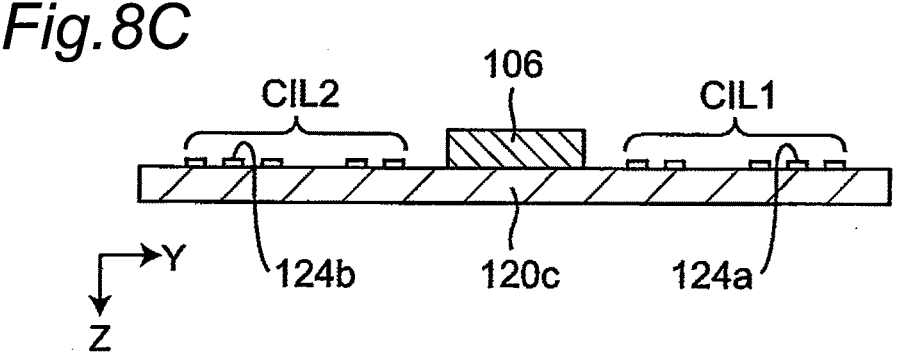
FIG. 8C is a cross-sectional view of the lower insulating layer taken along a line B3-B3 shown in FIG. 7C.

FIG. 7A is a top view of an upper insulating layer of the multilayer substrate 120. FIG. 7B is a top view of a center insulating layer of the multilayer substrate 120. FIG. 7C is a top view of a lower insulating layer of the multilayer substrate 120. FIG. 8A is a cross-sectional view of the insulating layer taken along a line B1-B1 shown in FIG. 7A. FIG. 8B is a cross-sectional view of the insulating layer taken along a line B2-B2 shown in FIG. 7B. FIG. 8C is a cross-sectional view of the insulating layer taken along a line B3-B3 shown in FIG. 7C.

As shown in FIG. 6, the multilayer substrate 120 incorporates the RFIC chip 106 and a feeding circuit 122 acting as the matching circuit 108. The multilayer substrate 120 is provided with the first terminal electrode 102 and the second terminal electrode 104. The first terminal electrode 102 is connected to the land portion 14a of the first radiation electrode 14. The second terminal electrode 104 is connected to the land portion 16a of the second radiation electrode 16.

The RFIC chip 106 has a structure in which various elements are built in a semiconductor substrate made of a semiconductor such as silicon. As shown in FIG. 7C, the RFIC chip 106 is provided with the first input/output terminal 106a and the second input/output terminal 106b.

As shown in FIG. 6, the feeding circuit 122 is made up of a coil conductor 124 and interlayer connection conductors 126, 128. The coil conductor 124 is made up of coil patterns 124a to 124c shown in FIG. 7B or 7C. The coil pattern 124a constitutes a first coil part CIL1. The coil pattern 124b constitutes a second coil part CIL2. The coil pattern 124c constitutes a third coil part CIL3 and a fourth coil part CIL4.

The first coil part CIL1, the third coil part CIL3, and the interlayer connection conductor 126 are arranged in line in the thickness direction (Z-axis direction) at a position on one side in the length direction (Y-axis direction). The second coil part CIL2, the fourth coil part CIL4, and the interlayer connection conductor 128 are arranged in line in the thickness direction (Z-axis direction) at a position on the other side in the length direction (Y-axis direction).

When the multilayer substrate 120 is viewed in the height direction (i.e., the Z-axis direction), the RFIC chip 106 is disposed between the first coil part CIL1 and the second coil part CIL2. The RFIC chip 106 is disposed also between the third coil part CIL3 and the fourth coil part CIL4.

The first terminal electrode 102 is disposed at a position on the one side in the length direction (Y-axis direction), and the second terminal electrode 104 is disposed at a position on the other side. The first and second terminal electrodes 102, 104 are made of copper foil having flexibility and are formed into a strip shape of the same size.

As shown in FIGS. 7A to 7C, the multilayer substrate 120 is made up of three laminated sheet-shaped insulating layers 120a to 120c. The insulating layer 120b is located between the upper insulating layer 120a and the lower insulating layer 120c.

The first terminal electrode 102 and the second terminal electrode 104 are formed on the insulating layer 120a.

A through-hole HL1 having a rectangular cross section is formed at the center of the insulating layer 120b. The through-hole HL1 is formed into a size accommodating the RFIC chip 106. The belt-like coil pattern 124c is formed around the through-hole HL1 of the insulating layer 120b. The coil pattern 124c is made of flexible copper foil.

One end portion of the coil pattern 124c overlaps with the first terminal electrode 102 when viewed in the thickness direction (viewed in the Z-axis direction), and is connected to the first terminal electrode 102 by an interlayer connection conductor 130 extending in the thickness direction (Z-axis direction). The other end portion of the coil pattern 124c overlaps with the second terminal electrode 104 when viewed in the thickness direction, and is connected to the second terminal electrode 104 by an interlayer connection conductor 132 extending in the thickness direction. The interlayer connection conductors 130, 132 are made up of metal bulks containing Sn as a main component.

The coil pattern 124c goes round the one end portion twice in the counterclockwise direction and subsequently bends to extend in the length direction (Y-axis direction). The coil pattern 124c extending in the length direction (Y-axis direction) bends in the width direction (X-axis direction) and goes round the other end portion twice in the counterclockwise direction before reaching the other end portion.

The belt-like coil patterns 124a, 124b are formed on the insulating layer 120c. The coil patterns 124a, 124b are made of flexible copper foil.

An outer end portion (a first coil end T1) of the coil pattern 124a is disposed at a position overlapping with one corner portion of the rectangular through-hole HL1. An outer end portion (a second coil end T2) of the coil pattern 124b is disposed at a position overlapping with a corner portion arranged in the length direction (Y-axis direction) with respect to the corner portion at which the first coil end T1 is disposed out of the four corner portions of the rectangular through-hole HL1.

Assuming an end portion on the center side of the coil pattern 124a as a starting point, the coil pattern 124a goes round the center end portion 2.5 times in the clockwise direction and subsequently bends in the width direction (X-axis direction) to reach the other end (the first coil end T1). Similarly, assuming an end portion on the center side of the coil pattern 124b as a starting point, the coil pattern 124b goes round the center end portion 2.5 times in the counterclockwise direction and subsequently bends in the width direction (X-axis direction) to reach the other end (the second coil end T2). The center end portion of the coil pattern 124a is connected to the one end portion of the coil pattern 124c by the interlayer connection conductor 126 extending in the thickness direction (Z-axis direction). The center end portion of the coil pattern 124b is connected to the other end portion of the coil pattern 124c by the interlayer connection conductor 128 extending in the thickness direction. The interlayer connection conductors 126, 128 are made up of metal bulks containing Sn as a main component.

In the exemplary aspect, dummy conductors 134, 136 are formed on the insulating layer 120c. Preferably, the dummy conductors 134, 136 are made of flexible copper foil. When the insulating layers 120b, 120c are viewed in the thickness direction (viewed in the Z-axis direction), the dummy conductors 134, 136 are disposed to overlap with respective corner portions opposite in the width direction (X-axis direction) to the corner portions at which the first and second coil ends T1, T2 are disposed, out of the four corner portions of the rectangular through-hole HL1.

The RFIC chip 106 is mounted on the insulating layer 120c such that the four corner portions thereof respectively face the first coil end T1, the second coil end T2, and the dummy conductors 134, 136. The first input/output terminal 106a is connected to the first coil end T1, and the second input/output terminal 106b is connected to the second coil end T2.

The thickness of the insulating layers 120a to 120c is 10 μm or more and 100 μm or less. Therefore, the RFIC chip 106 and the feeding circuit 122 built in the multilayer board 120 are seen through from the outside. Thus, the connection state (presence/absence of breaking) of the RFIC chip 106 and the feeding circuit 122 can easily be confirmed.

In the RFIC device 100 shown by the equivalent circuit in FIG. 4, an inductor L1 corresponds to the first coil part CIL1. An inductor L2 corresponds to the second coil part CIL2. An inductor L3 corresponds to the third coil part CIL3. An inductor L4 corresponds to the fourth coil part CIL4. The characteristics of impedance matching by the feeding circuit 122 are defined by the values of the inductors L1 to L4.

One end portion of the inductor L1 is connected to the first input/output terminal 106a of the RFIC chip 106. One end portion of the inductor L2 is connected to the second input/output terminal 106b of the RFIC chip 106. The other end portion of the inductor L1 is connected to one end portion of the inductor L3. The other end portion of the inductor L2 is connected to one end portion of the inductor L4. The other end portion of the inductor L3 is connected to the other end portion of the inductor L4. The first terminal electrode 102 is connected to a connection point of the inductors L1, L3. The second terminal electrode 104 is connected to a connection point of the inductors L2, L4.

As can be seen from the equivalent circuit shown in FIG. 4, the first coil part CIL1, the second coil part CIL2, the third coil part CIL3, and the fourth coil part CIL4 are wound to generate magnetic fields in phase and are connected in series to each other. Therefore, the magnetic fields generated from these coil parts CIL1 to CIL4 are oriented in the same direction.

As can be seen from FIGS. 7B and 7C, the first coil part CIL1 and the third coil part CIL3 have substantially the same loop shape and the same first winding axis. Similarly, the second coil part CIL2 and the fourth coil part CIL4 have substantially the same loop shape and the same second winding axis. The first winding axis and the second winding axis are arranged at positions sandwiching the RFIC chip 106.

Therefore, the first coil part CIL1 and the third coil part CIL3 are magnetically and capacitively coupled. Similarly, the second coil part CIL2 and the fourth coil part CIL4 are magnetically and capacitively coupled.

The RFIC chip 106 is made up of a semiconductor substrate. Therefore, the RFIC chip 106 functions as a ground or a shield for the first coil part CIL1, the second coil part CIL2, the third coil part CIL3, and the fourth coil part CIL4. Consequently, it is difficult for the first coil part CIL1 and the second coil part CIL2 as well as the third coil part CIL3 and the fourth coil part CIL4 to magnetically and capacitively couple each other. This can reduce the concern that a passband of a communication signal becomes narrower.

As shown in FIG. 6, the first coil part CIL1 and the third coil part CIL3 of the RFIC element 100 overlap with the land portion 14a of the first radiation electrode 14, and the second coil part CIL2 and the fourth coil part CIL4 overlap with the land portion 16a of the second radiation electrode 16. Therefore, the land portions 14a, 16a of the first and second radiation electrodes 14, 16 are positioned between the coil parts CIL1, CIL2, CIL3, CIL4 in the RFIC device 100 and the attachment surface 12b of the dielectric substrate 12. Each of the land portions 14a, 16a is an open-end electrode, and the coil parts (CIL1, CIL2, CIL3, CIL4) of the RF device 100 form one coil extending between the two electrodes, which prevents formation of one electrode completely blocking the opening of the coil. As a result, the coil parts CIL1, CIL2, CIL3, CIL4 in the RFIC device 100 are less affected by the potential of the metal surface Ga of the article G attached to the attachment surface 12b of the dielectric substrate 12, and therefore, the coil parts CIL1, CIL2, CIL3, CIL4, i.e., the matching circuit 108, can stably function.

According to the configuration described above, the wireless communication device 10 can communicate even when attached to the metal surface Ga of the article G, has flexibility, and has a high communication capability, i.e., can radiate radio waves with high radiation efficiency. This will specifically be described.

As described above and as shown in FIG. 4, the matching circuit 108 of the RFIC element 100 achieves the impedance matching between the first and the second radiation electrodes 14, 16 and the RFIC chip 106 of the RFIC element 100. Additionally, a resonance circuit is formed by the parasitic inductor L5 of the second radiation electrode 16 and the stray capacitance C2 between the second radiation electrode 16 and the metal surface Ga of the article G opposite thereto. Therefore, the wireless communication device 10 has favorable communication characteristics at, for example, a frequency of the UHF band (e.g., 900 MHz).

As shown in FIG. 1, the wireless communication device 10 is attached to the metal surface Ga of the article G via the dielectric substrate 12. Since the thickness of the dielectric substrate 12 is uniform, the distance between the metal surface Ga of the article G attached to the attachment surface 12b of the dielectric substrate 12 and the first radiation electrode 14, i.e., a stray capacitance C1 therebetween, is uniform regardless of a position on the first radiation electrode 14. The distance between the second radiation electrode 16 and the metal surface Ga of the article G, i.e., the stray capacitance C2 therebetween, is also uniform regardless of a position on the second radiation electrode 16. Therefore, regardless of a type of the article G, as shown in FIG. 4, the resonance frequency becomes stable in the resonance circuit formed by the parasitic inductor L5 of the second radiation electrode 14 and the stray capacitance C2.

In the case of this embodiment, the wireless communication device 10 has flexibility. In other words, the constituent elements of the wireless communication device 10, i.e., the dielectric substrate 12, the first radiation electrode 14, the second radiation electrode 16, and the RFIC element 100, are made of flexible materials. Therefore, the wireless communication device 10 can be attached not only to a flat surface but also to a curved surface.

Figure 9:
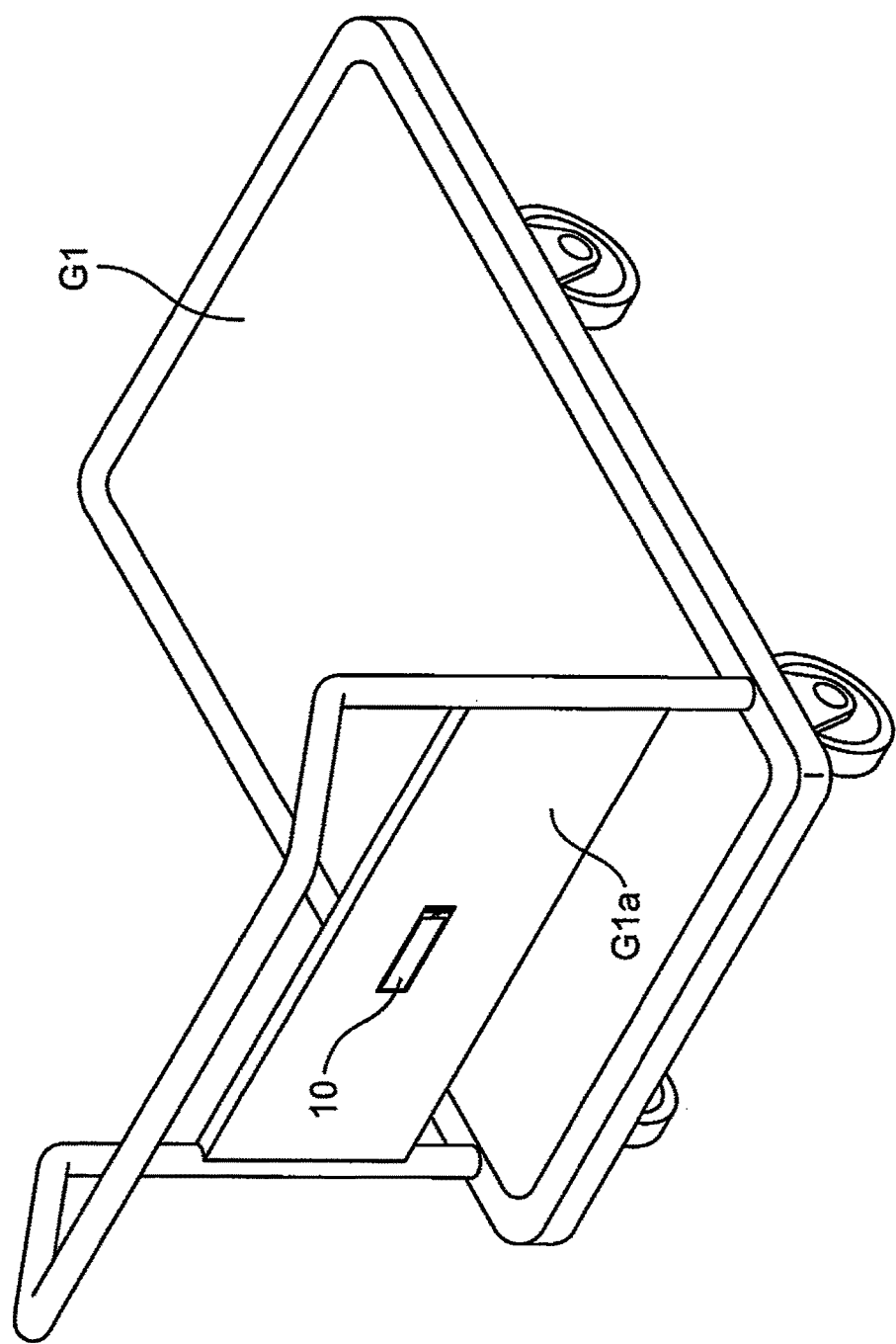
FIG. 9 is a view of the wireless communication device attached to a cart that is an example of the article.
Figure 10:
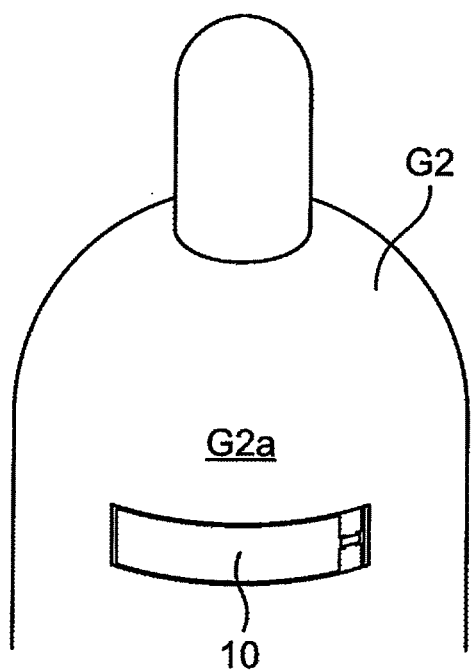
FIG. 10 is a view of the wireless communication device attached to a gas cylinder that is an example of the article.
Figure 11:
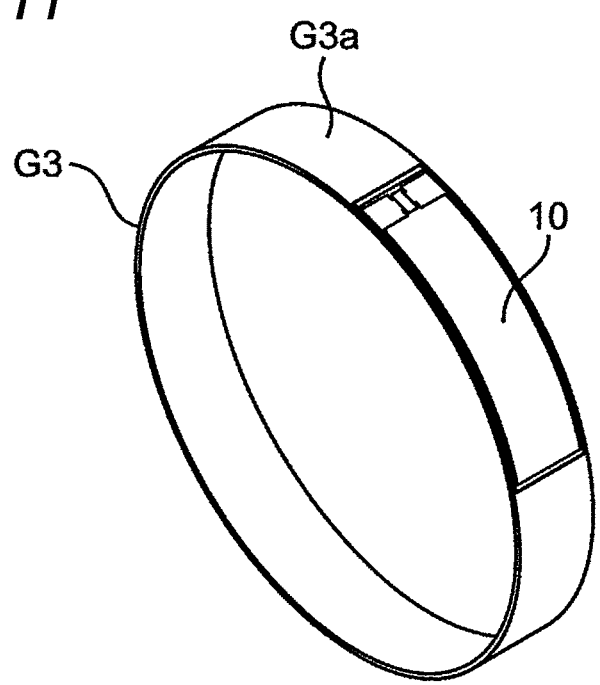
FIG. 11 is a view of the wireless communication device attached to a ring that is an example of the article.

Thus, the wireless communication device exhibits uniform communication characteristics even when attached to various articles. For example, even when the device is attached in a flat state to a planar metal surface G1a of a cart G1 as shown in FIG. 9, attached in a curved state to a curved metal surface G2a of a gas cylinder G2 shown in FIG. 10, or attached to and bent on a metal surface G3a of a ring (band) G3 formed of a flexible metal thin plate shown in FIG. 11, the distance is uniform between the metal surface of the article and the first and second radiation electrodes 14, 16, so that the device exhibits uniform communication characteristics.

Furthermore, in the case of this embodiment, the wireless communication device 10 can be made thinner. In particular, the device can be made thinner while suppressing a reduction in communication distance.

In general, when the wireless communication device 10 is made thinner, i.e., when the dielectric substrate 12 is made thinner (when the distance is reduced between the metal surface Ga of the article G and the first and second radiation electrodes 14, 16), the stray capacitances C1, C2 between the metal surface Ga of the article G and the first and second radiation electrodes 14, 16 become larger. When the stray capacitances C1, C2 become larger, a large amount of the current flowing through the first and second radiation electrodes 14, 16 is consumed for electric field formation in the stray capacitances C1, C2, and therefore, the radiation efficiency of the radio waves from the radiation electrodes 14, 16 deteriorates. When the radiation efficiency decreases, the radio waves are emitted with low radio field intensity, so that the communication distance of the wireless communication device becomes shorter.

However, the present inventor determined that a reduction in the communication distance of the wireless communication device due to thinning of the dielectric substrate 12 can be suppressed by the shapes of the first and second radiation electrodes 14, 16.

First, as shown in FIG. 2, the first radiation electrode 14 and the second radiation electrode 16 are different in shape. Specifically, the first radiation electrode 14 extends in the width direction (X-axis direction) of the wireless communication device 10, and the second radiation electrode 16 extends in the length direction (Y-axis direction). The width W1 and the length L1 of the first radiation electrode 14 are smaller than the width W2 and the length L2 of the second radiation electrode 16.

According to the first radiation electrode 14 and the second radiation electrode 16 as described above, the direction of the current flowing through the first radiation electrode 14 and the direction of the current flowing through the second radiation electrode 16 substantially intersect with each other, i.e., substantially differ by 90 degrees. Specifically, the current flows through the first radiation electrode 14 mainly in the width direction (X-axis direction) of the wireless communication device 10, and the current flows through the second radiation electrode 16 mainly in the length direction (Y-axis direction).

It is confirmed by the inventor through testing described later that when the direction of the current flowing through the first radiation electrode 14 and the direction of the current flowing through the second radiation electrode 16 substantially differ by 90 degrees in this way, the wireless communication device 10 has a long communication distance (e.g., a communication distance of about 2.0 m or more) even though the dielectric substrate 12 is thin (e.g., 0.2 mm or more and 1 mm or less).

Table 1 shows shape features of Samples A to G of multiple wireless communication devices tested by the inventor and the test result, i.e., communication distance d.

TABLE 1

| | | sample | | | | | | |
|---|---|---|---|---|---|---|---|---|
| | | A | B | C | D | E | F | G |
| first radiation electrode | length L1 (mm) | 10 | 18 | 18 | 18 | 42 | 42 | 42 |
| | width W1 (mm) | 0.3 | 0.3 | 0.3 | 0.3 | 0.3 | 0.3 | 0.3 |
| second radiation electrode | length L2 (mm) | 144 | 144 | 133 | 97 | 144 | 135 | 120 |
| | width W2 (mm) | 10 | 18 | 18 | 18 | 42 | 42 | 42 |
| | constriction width K1 (mm) | — | — | — | 7.0 | — | — | — |
| | constriction length K2 (mm) | — | — | — | 30 | — | — | — |
| | dielectric substrate thickness t (mm) | 1.0 | 1.0 | 0.25 | 1.0 | 1.0 | 0.4 | 0.2 |
| | communication distance d (m) | 4.0 | 5.4 | 1.6 | 2.0 | 9.0 | 5.5 | 1.8 |

Figure 12:
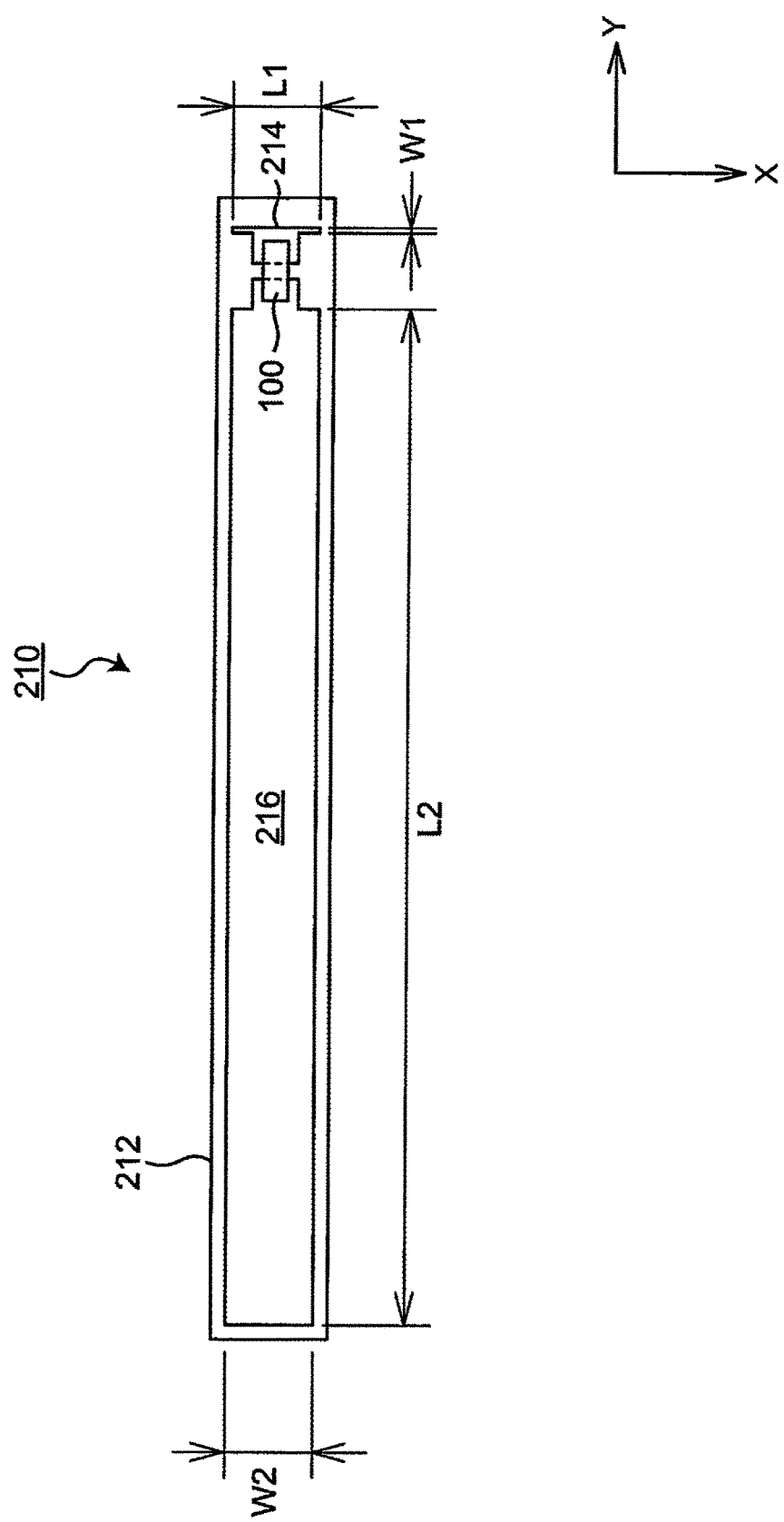
FIG. 12 is a top view of a wireless communication device according to another exemplary embodiment.

Samples A to D correspond to a relatively elongated wireless communication device 210 as shown in FIG. 12. Samples E to G correspond to the relatively wide wireless communication device 10 as shown in FIG. 2. The length L2 of the second radiation electrode in these Samples A to D, E to G is about half of the wavelength of radio waves. Sample D will be described later.

According to an exemplary aspect, the electrodes of Samples A to G of these wireless communication modules are fabricated from aluminum films. The dielectric substrates are fabricated from a porous EVA resin having the permittivity of 2.8. The measurement of the communication distance was performed with each of Samples A to G disposed at the center of a 15 cm×15 cm piece of aluminum foil assumed as a metal surface of an article.

Comparing these samples, particularly comparing Samples A, B, and E, it can be seen that the communication distance d becomes longer as the length L1 of the first radiation electrode increases.

Figure 13:
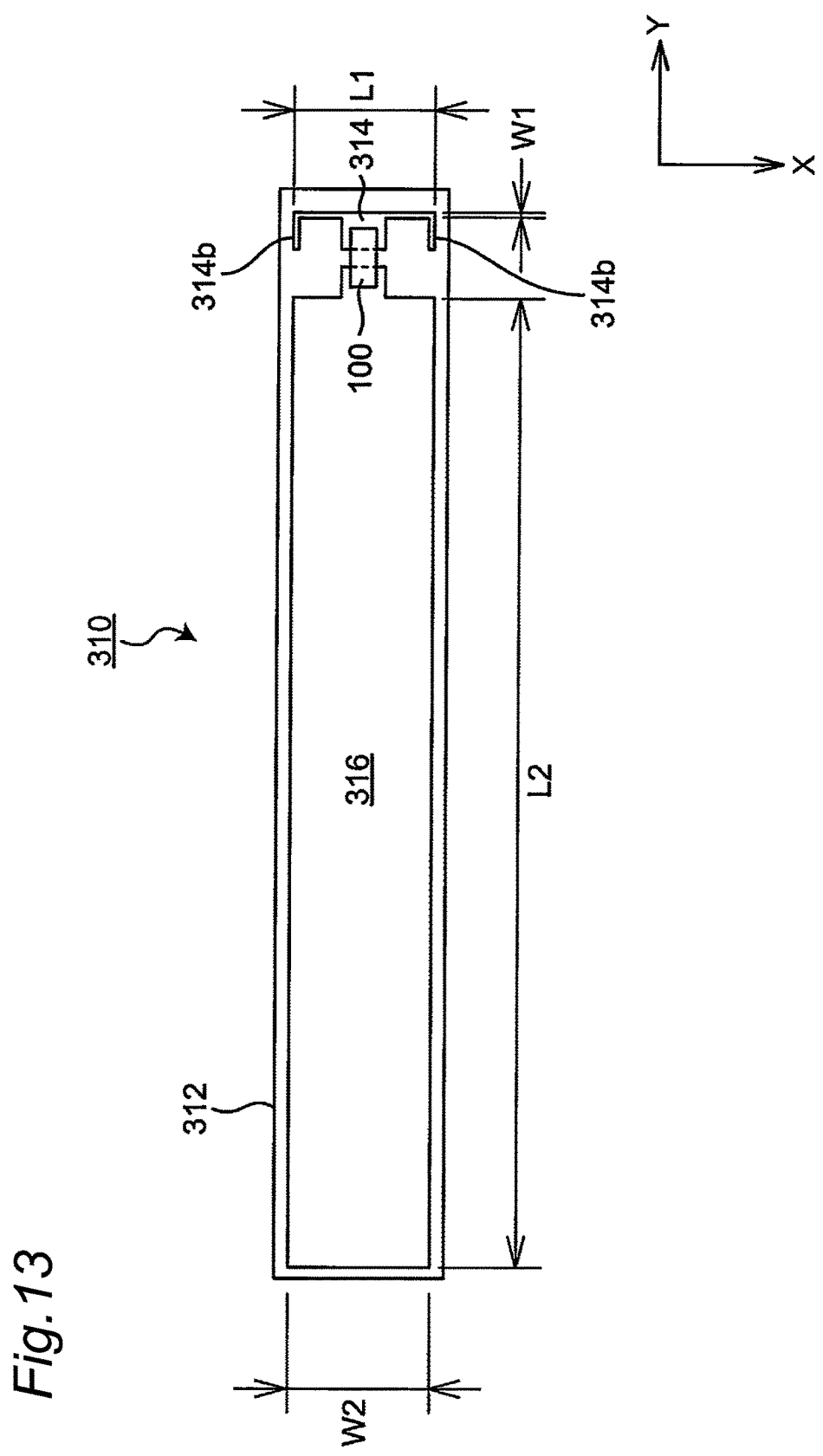
FIG. 13 is a top view of a wireless communication device according to yet another exemplary embodiment.

It is noted that as the length of L1 of the first radiation electrode increases, the width (size in the X-axis direction) of the wireless communication device increases. In the case of increasing the length of L1 of the first radiation electrode while suppressing an increase in the width of the wireless communication device, both end portions 314b of the first radiation electrode 314 may be bent as in a wireless communication device 310 shown in FIG. 13. In the case of the wireless communication device 310 shown in FIG. 13, the end portions 314b on both sides of the first radiation electrode 314 extending in the width direction (X-axis direction) of the wireless communication device 310 are bent by about 90 degrees toward the second radiation electrode 316. Therefore, the wireless communication device 310 has a compact size in the width direction as compared to the case of the first radiation electrode 314 extending linearly without bending.

Additionally, it can be seen that even if the thickness t of the dielectric substrate, i.e., the distance between the first/second radiation electrodes and the metal surface of the article, is 1 mm or less, the communication distance of about 2 m can be achieved, which is a long distance for an RFID tag.

Comparing Samples B and D, these samples are different in the shape of the second radiation electrode and the communication distance. In the case of Sample B, the length L2 of the second radiation electrode is longer than the sample D and is about half wavelength. Therefore, the communication distance d of Sample B is 5.4 m, which is more than sufficient for an RFID tag.

On the other hand, in the case of Sample D, the length L2 of the second radiation electrode is shorter than the half wavelength; however, the communication distance d is still 2 m, which is sufficient for an RFID tag. This is because, as shown in FIG. 14, a wireless communication device 410 of Sample D includes a constriction 416b in a second radiation electrode 416.

Specifically, in the case of the samples excluding Sample D, while the length L2 of the second radiation electrode is about half wavelength, a resonance circuit acquiring a desired resonance frequency (e.g., 900 MHz) is formed by the parasitic inductor of the second radiation electrode and the stray capacitance between the second radiation electrode and the metal surface of the article (i.e., the thickness of the dielectric substrate). Therefore, when the length L2 of the second radiation electrode becomes shorter than the half wavelength, the parasitic inductance decreases and the resonance frequency of the resonance circuit shifts from the desired resonance frequency. Consequently, the sensitivity of the wireless communication device decreases and the communication distance becomes shorter.

Figure 14:
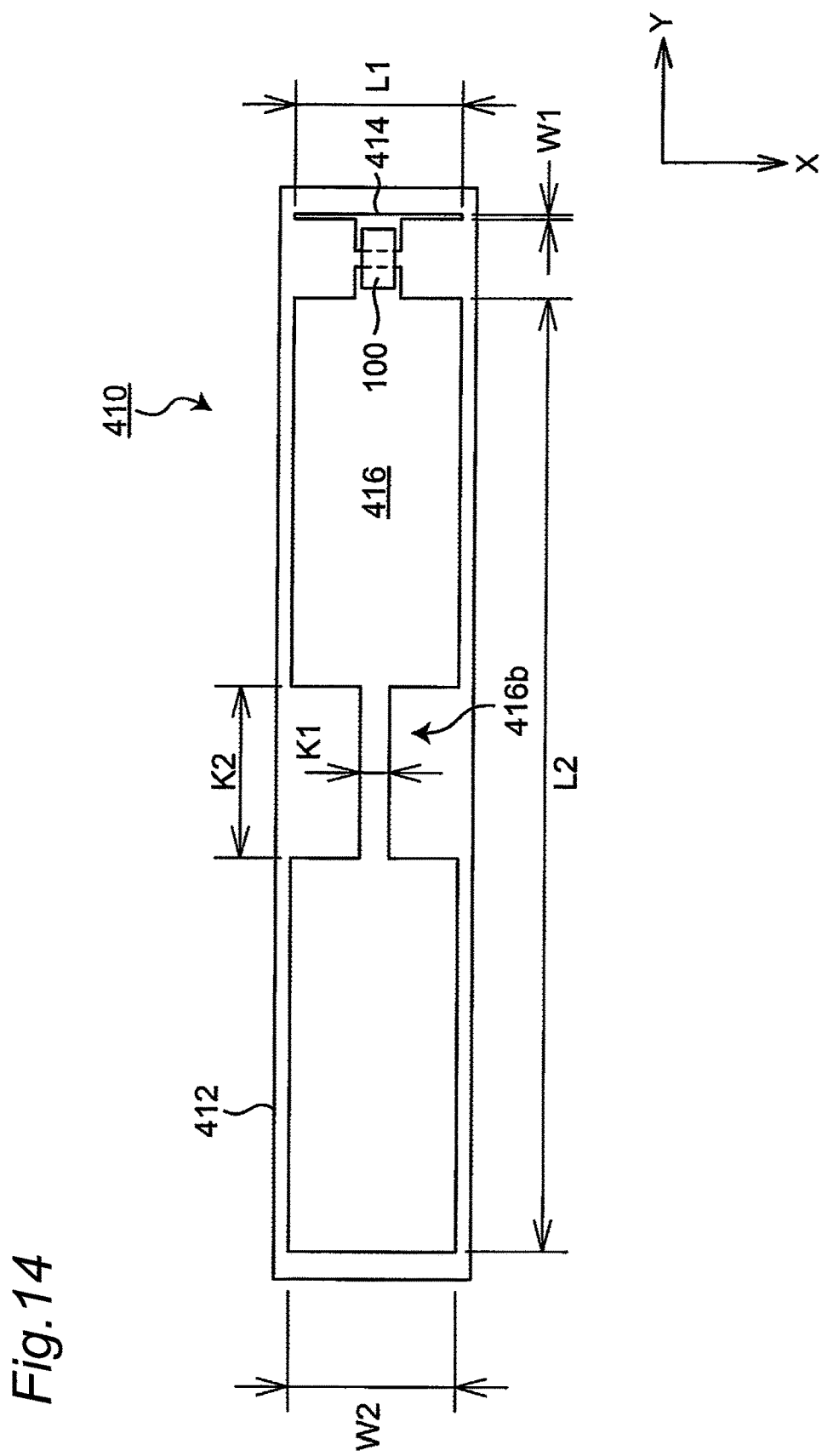
FIG. 14 is a top view of a wireless communication device according to a different exemplary embodiment.

As shown in FIG. 14, the constriction 416b is constructed by forming notches opposite to each other at both ends of the second radiation electrode 416 in the width direction (X-axis direction). The constriction 416b is a portion reduced in area as compared to the other portion in terms a cross section orthogonal to the extending direction (Y-axis direction) of the second radiation electrode 416 that is the direction in which the current mainly flows, and the portion functions as a current concentration portion where the current concentrates. When the current concentrates, the parasitic inductance of the second radiation electrode increases. Therefore, the parasitic inductance reduced by a reduction in the length L2 of the second radiation electrode can be compensated by the constriction 416b, i.e., the current concentration portion.

In the case of sample D, the length L2 of the second radiation electrode 416 is shorter than the half wavelength of the radio waves, and therefore, the communication distance is shorter than Sample B. However, Sample D is provided with the constriction 416b in the second radiation electrode 416 so that the communication distance d of about 2 m is ensured.

Therefore, by appropriately adjusting the shape of the constriction, the length of the wireless communication device (the length L2 of the second radiation electrode) and the communication distance d can be adjusted as desired. For example, if a wireless communication device made as compact as possible in size is desirable while the communication distance may be several meters, the second radiation electrode 416 may be provided with a constriction as in Sample D shown in FIG. 14. On the other hand, if a wireless communication device with the communication distance made as long as possible is desirable regardless of size, the length L2 of the second radiation electrode may be set to about half of the wavelength of radio waves.

According to such an embodiment, the wireless communication device capable of wireless communication even when attached to a metal surface of an article can be made thinner while suppressing a reduction in communication distance.

Although the exemplary wireless communication device has been described with the exemplary embodiment above, such embodiments of the present disclosure are not limited thereto.

For example, in the case of the embodiment described above, as shown in FIG. 4, the RFIC element 100 has the RFIC chip 106 and the matching circuit 108 achieving impedance matching between the RFIC chip 106 and the first and second radiation electrodes 22, 24. However, exemplary embodiments are not limited thereto. The matching circuit 108 may not be included as long as the impedance matching can be achieved between the RFIC chip 106 and the first and second radiation electrodes 22, 24 by the impedance of the RFIC chip 106 itself. In this case, the RFIC chip 106 itself constitutes the RFIC element 100.

In the case of the embodiment described above, as shown in FIG. 3, the attachment surface 12b of the dielectric substrate 12 of the wireless communication device 10 is not provided with an electrode etc. unlike the principal surface 12a. However, exemplary embodiments are not limited thereto.

Figure 15:
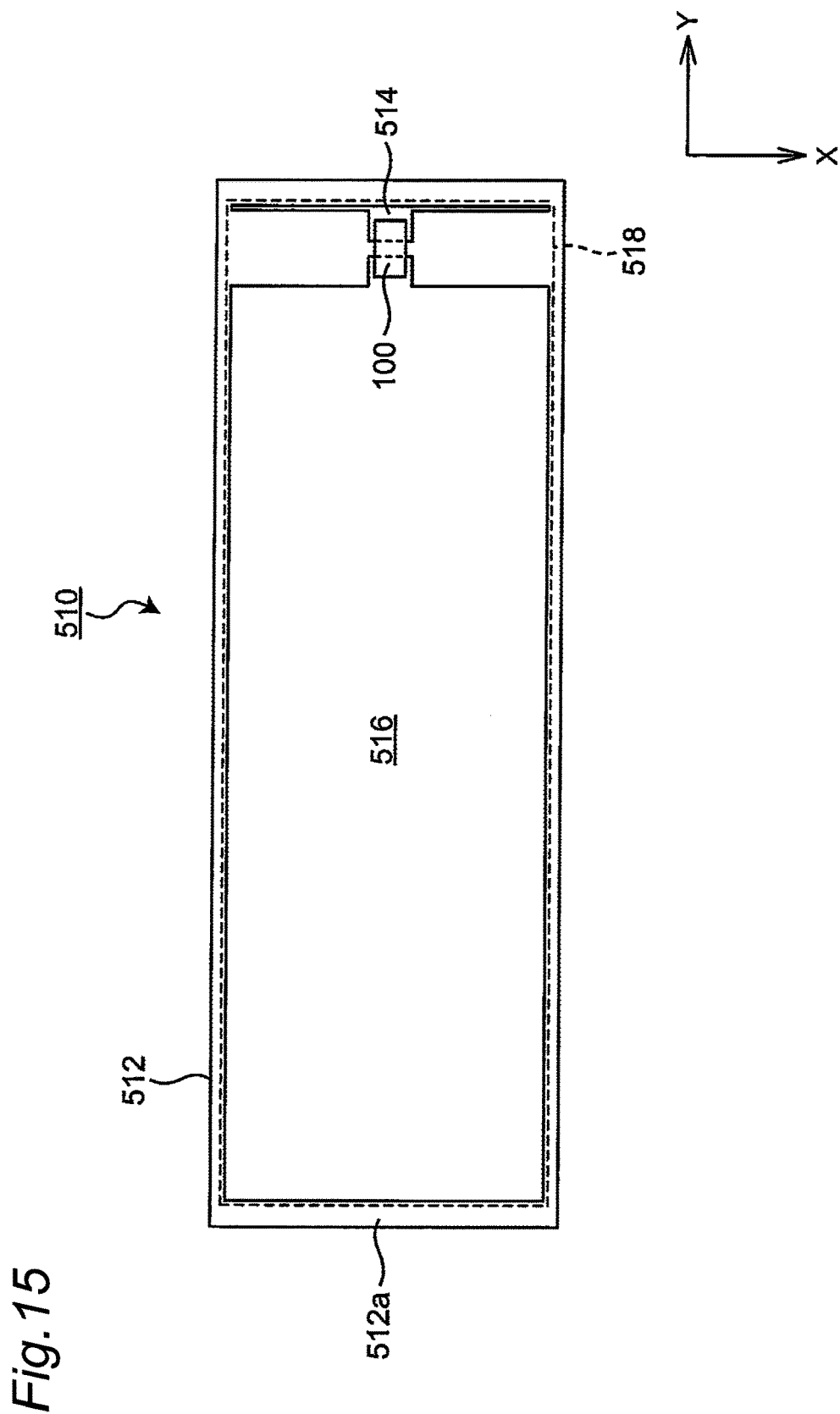
FIG. 15 is a top view of a wireless communication device according to a further exemplary embodiment.
Figure 16:
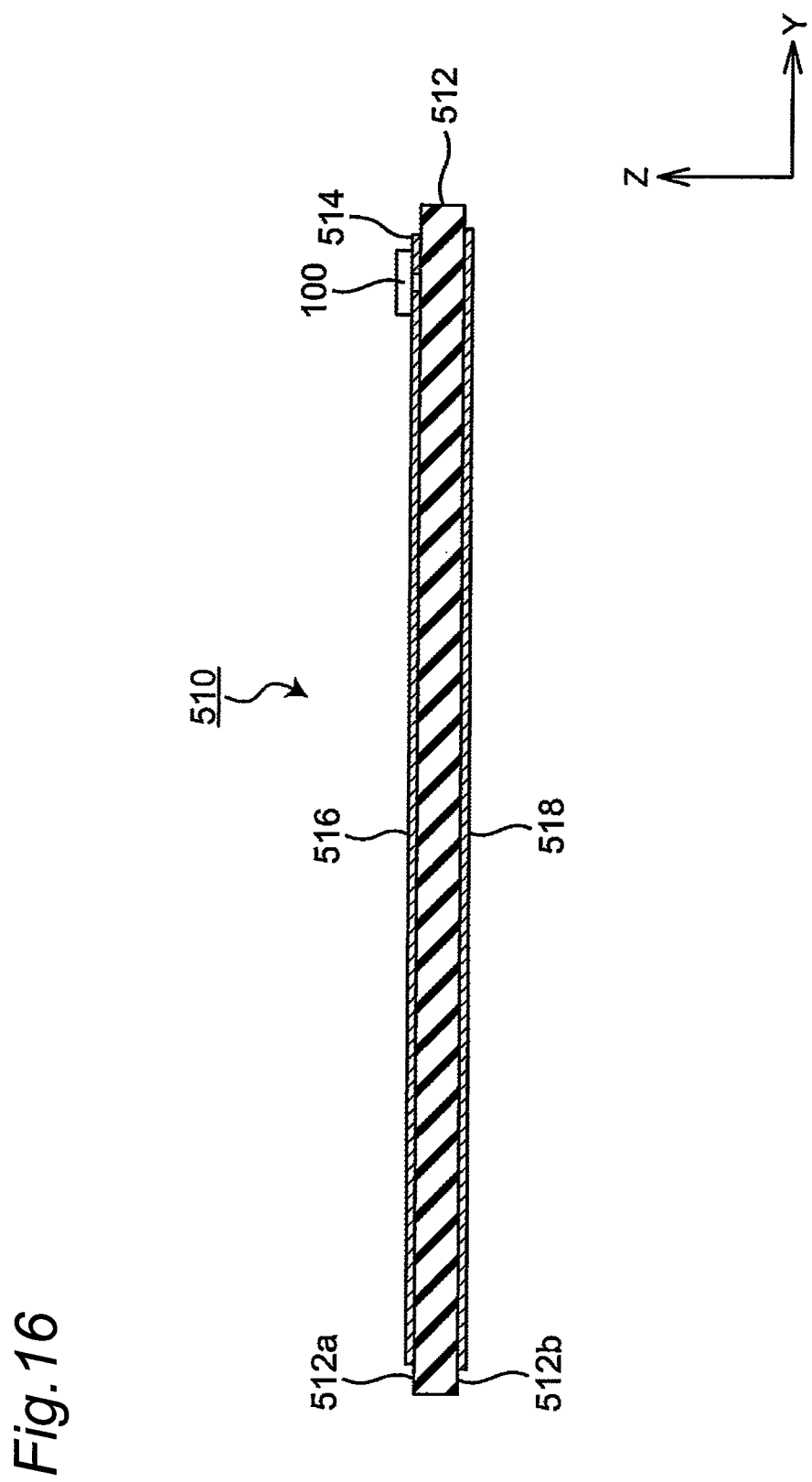
FIG. 16 is a cross-sectional view of the wireless communication device shown in FIG. 15.

For example, a wireless communication device 510 shown in FIGS. 15 and 16 includes a conductive layer (e.g., a copper film, an aluminum film) 518 on an attachment surface 512b of a dielectric substrate 512. The conductive layer 518 is not galvanically connected to first and second radiation electrodes 514, 516 disposed on a principal surface 512a of a dielectric substrate 512, and is in a state independent of the radiation electrodes 514, 516. In other words, the conductive layer 518 is not physically connected to first and second radiation electrodes 514, 516. In this aspect, the wireless communication device 510 is configured to be attached to the metal surface Ga of the article G via a seal layer (not shown) disposed on this conductive layer 518.

The reason of disposing the conductive layer 518 on the attachment surface 512b of the dielectric substrate 512 as shown in FIG. 16 will be described as follows.

Specifically, the metal surface of the article with the wireless communication device attached thereto is not necessarily a smooth surface. The metal surface has unevenness in some cases. If the attachment surface without the conductive layer is attached to the uneven metal surface, the stray capacitance between the second radiation electrode and the metal surface differs depending on a position on the second radiation electrode. Therefore, the stray capacitance for the second radiation electrode is no longer uniform. Similarly, the stray capacitance for the first radiation electrode is no longer uniform.

To achieve uniform communication characteristics regardless of the surface shape of the metal surface of the article to which the wireless communication device 510 is attached, the wireless communication device 510 shown in FIGS. 15 and 16 has the conductive layer 518 on the attachment surface 512b of the dielectric substrate 512.

As shown in FIG. 15, the conductive layer 518 is opposite to the entire first radiation electrode 514 and the entire second radiation electrode 516 across the dielectric substrate 512. Therefore, a stray capacitance is formed between the first radiation electrode 514 and the conductive layer 518 (opposite portion), and a stray capacitance is formed between the second radiation electrode 516 and the conductive layer 518 (opposite portion).

As a result, regardless of an article to which the wireless communication device 510 is to be attached, the stray capacitance between each of the first and second radiation electrodes 514, 516 and the conductive layer 518 does not change. Therefore, the wireless communication device 510 can exhibit uniform communication characteristics regardless of a surface shape of the metal surface of the article to which the wireless communication device is attached.

Figure 17:
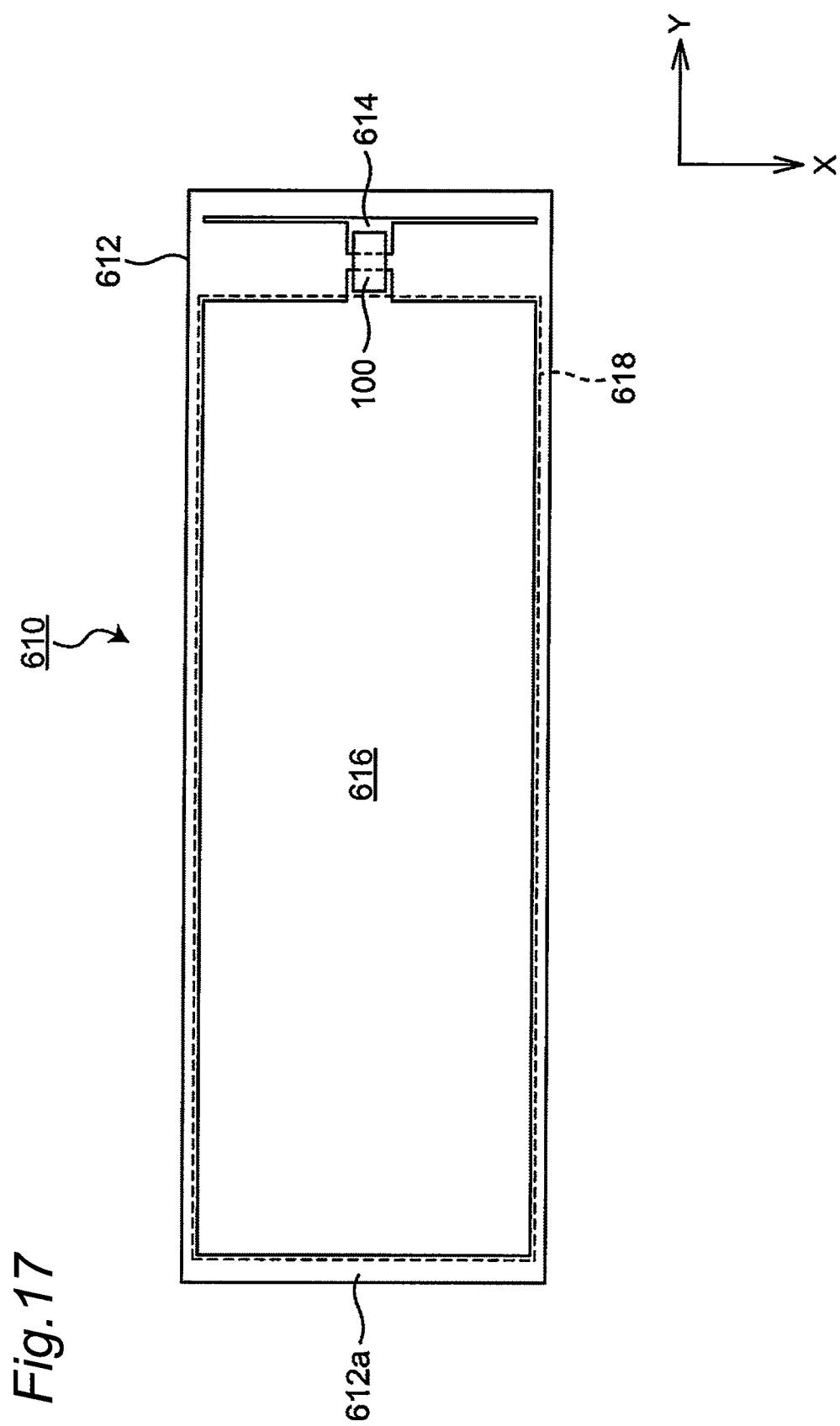
FIG. 17 is a top view of a wireless communication device according to a yet further exemplary embodiment.
Figure 18:
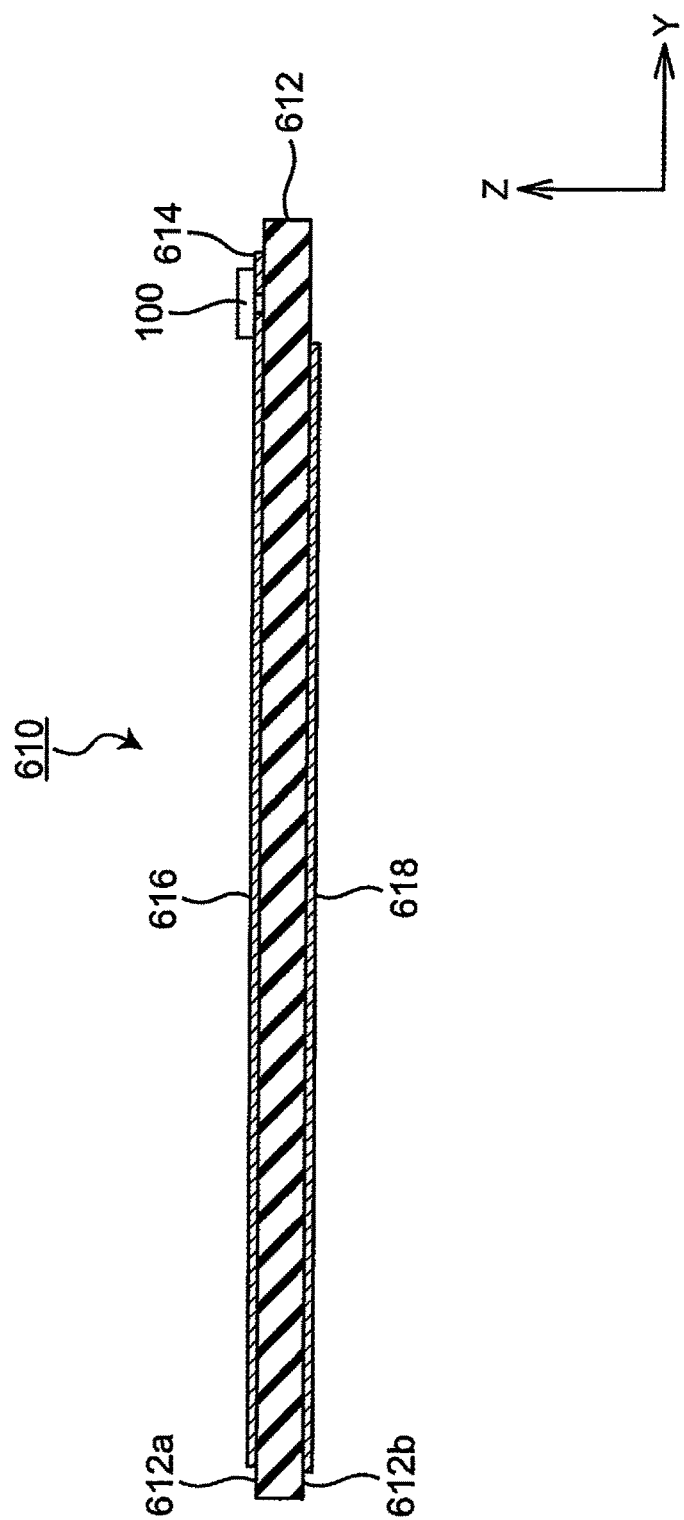
FIG. 18 is a cross-sectional view of the wireless communication device shown in FIG. 17.

FIGS. 17 and 18 show a wireless communication device in an improved form of the wireless communication device 510.

A wireless communication device 610 shown in FIGS. 17 and 18 also includes a conductive layer 618 on an attachment surface 612b of a dielectric substrate 612 as in the wireless communication device 510. However, as shown in FIG. 17, the conductive layer 618 is opposite to a second radiation electrode 616 disposed on a principal surface 612a of the dielectric substrate 612 and is not opposite to a first radiation electrode 614. Therefore, a stray capacitance is formed only between the second radiation electrode 616 and the conductive layer 618.

On the other hand, a stray capacitance is formed between the metal surface of the article attached to the attachment surface 612b of the wireless communication device 610 via the conductive layer 618 and the first radiation electrode 614. However, the capacitance value thereof is small. This is because the first radiation electrode 614 is opposite to the metal surface of the article via the dielectric substrate 612 and an air layer (a gap between the dielectric substrate 612 and the metal surface generated due to the thickness of the conductive layer 618).

Since the stray capacitance formed between the first radiation electrode 614 and the metal surface of the article is small, a large amount of the current flowing through the first radiation electrode 614 is used for radiation of radio waves. Therefore, the communication distance of the wireless communication device 610 is longer as compared to the wireless communication device 510 having the first radiation electrode 514 and the conductive layer 518 opposite to each other as shown in FIG. 16.

As a supplement, as described above and as shown in FIG. 5, the resonance circuit is formed by the second radiation electrode and the metal surface of the article opposite thereto, and the resonance frequency of the wireless communication device is thereby determined. Thus, even when the area of the portion of the conductor opposite to the first radiation electrode is zero (even when no conductor is present at a position opposite to the first radiation electrode in the thickness direction), the communication characteristics of the wireless communication device are substantially unchanged.

In the case of the exemplary embodiment described above as shown in FIG. 1, the first and second radiation electrodes 14, 16 are disposed on a substrate-like dielectric member, i.e., the dielectric substrate 12. However, exemplary embodiments are not limited thereto to the specific configuration.

Figure 19:
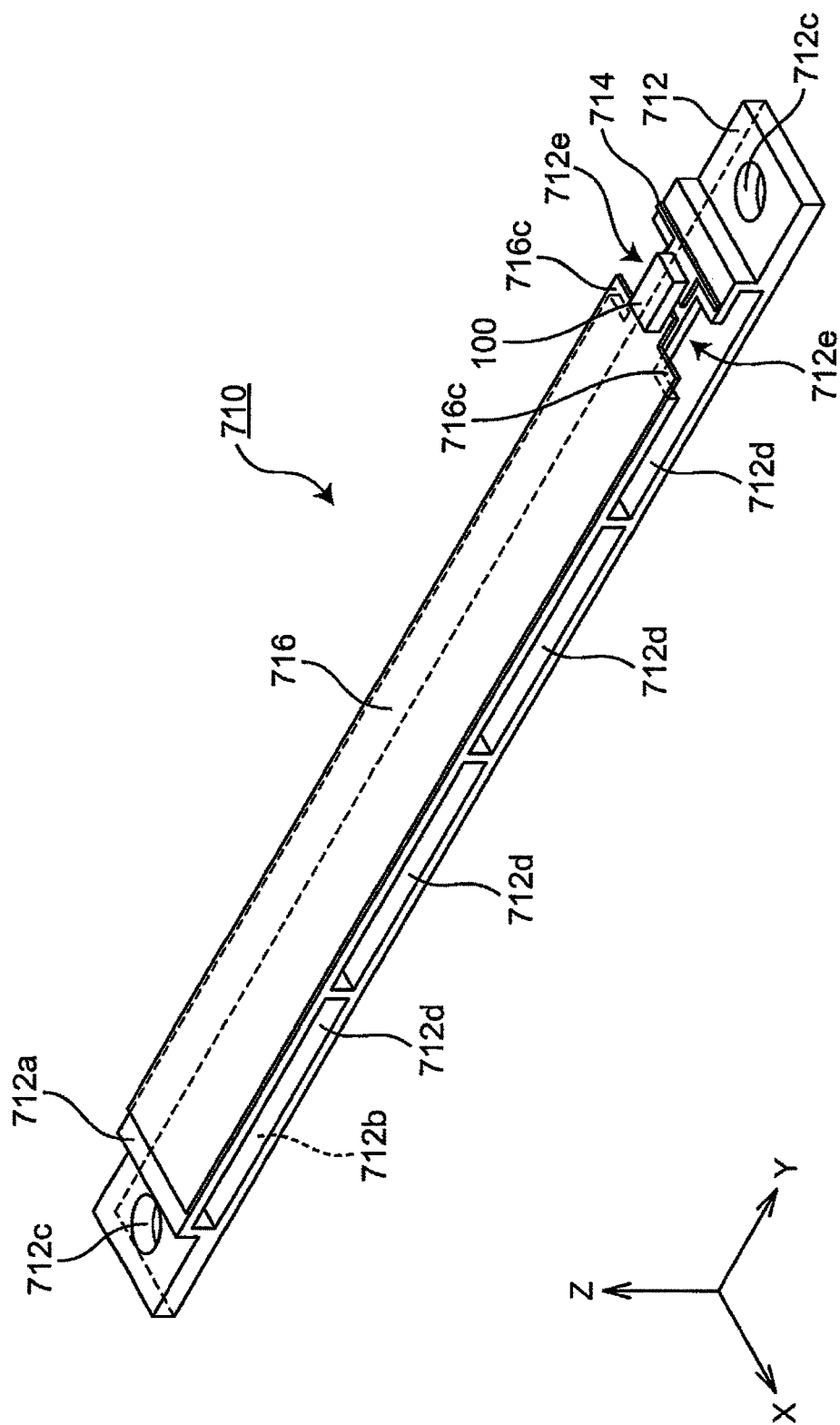
FIG. 19 is a perspective view of a wireless communication device according to a yet further exemplary embodiment.
Figure 20:
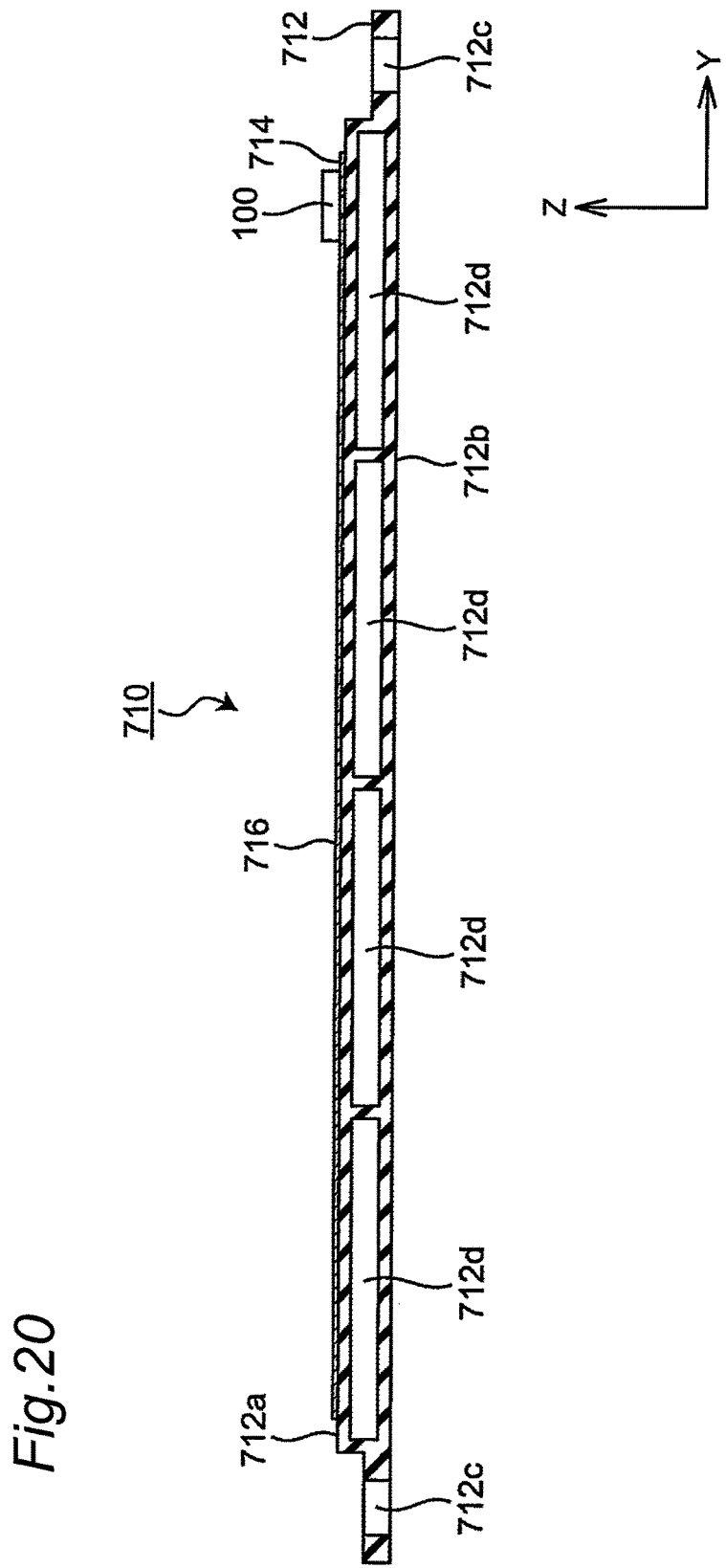
FIG. 20 is a cross-sectional view of the wireless communication device shown in FIG. 19.

In the case of a wireless communication device 710 shown in FIGS. 19 and 20, a dielectric member 712 provided with first and second radiation electrodes 714, 716 is not in a substrate shape and is a structure having an internal space 712d communicating with the outside.

Specifically, the dielectric member 712 has multiple internal spaces 712d between a principal surface 712a provided with the first and second radiation electrodes 714, 716 and an attachment surface 712b to which a metal surface of an article is attached. The dielectric member 712 also includes, at both ends in the length direction (Y-axis direction), through-holes 712c for bolts (not shown) for attaching the wireless communication device 710 to the article.

Since the internal spaces 712d are included, the stray capacitance becomes smaller between each of the first and second radiation electrodes 714, 716 and the metal surface of the article attached to the attachment surface 712b (as compared to when the internal spaces 712d are not included). In particular, since the relative permittivity of air in the internal spaces 712d is about one, the stray capacitance becomes smaller.

Since the internal spaces 712d are included in this way, the dielectric member 712 can be made thinner (as compared to when the internal spaces 712d do not exist). In particular, an increase in the stray capacitance between the first/second radiation electrodes 714, 718 and the metal surface of the object due to thinning can be offset by the internal spaces 712d.

Additionally, as shown in FIG. 19, at corner portions 716c of the second radiation electrode 716 on the RFIC element 100 side where a current concentrates (current density is high), the portions are not supported by the dielectric member 712. In particular, the dielectric member 712 includes recesses 712e at positions facing the corner portions 716c of the second radiation electrode 716.

The recesses 712e are provided to reduce the stray capacitance between the corner portions 716c of the second radiation electrode 716 and the metal surface of the article attached to the attachment surface 712b. This is because the recesses 712e provide a layer of air having the relative permittivity of about one therebetween.

When the stray capacitance becomes smaller due to the recesses 712e, the current consumed for electric field formation in this stray capacitance decreases at the corner portions 716c of the second radiation electrode 716 where the current concentrates (as compared to when the recesses 712e do not exist). The current radiated as radio waves accordingly increases, and the radiation efficiency is enhanced. Consequently, the communication distance of the wireless communication device 710 becomes longer.

The recesses 712e as described above may be disposed at corner portions of the first radiation electrode 714 where the current concentrates.

Furthermore, with regard to the exemplary embodiment described above as shown in FIG. 1, the first and second radiation electrodes 14, 16 are disposed on the outer surface of the principal surface 12a of the dielectric substrate 12. However, the position disposed with the first and second radiation electrodes 14, 16 is not limited to the principal surface of the dielectric substrate.

Figure 21:
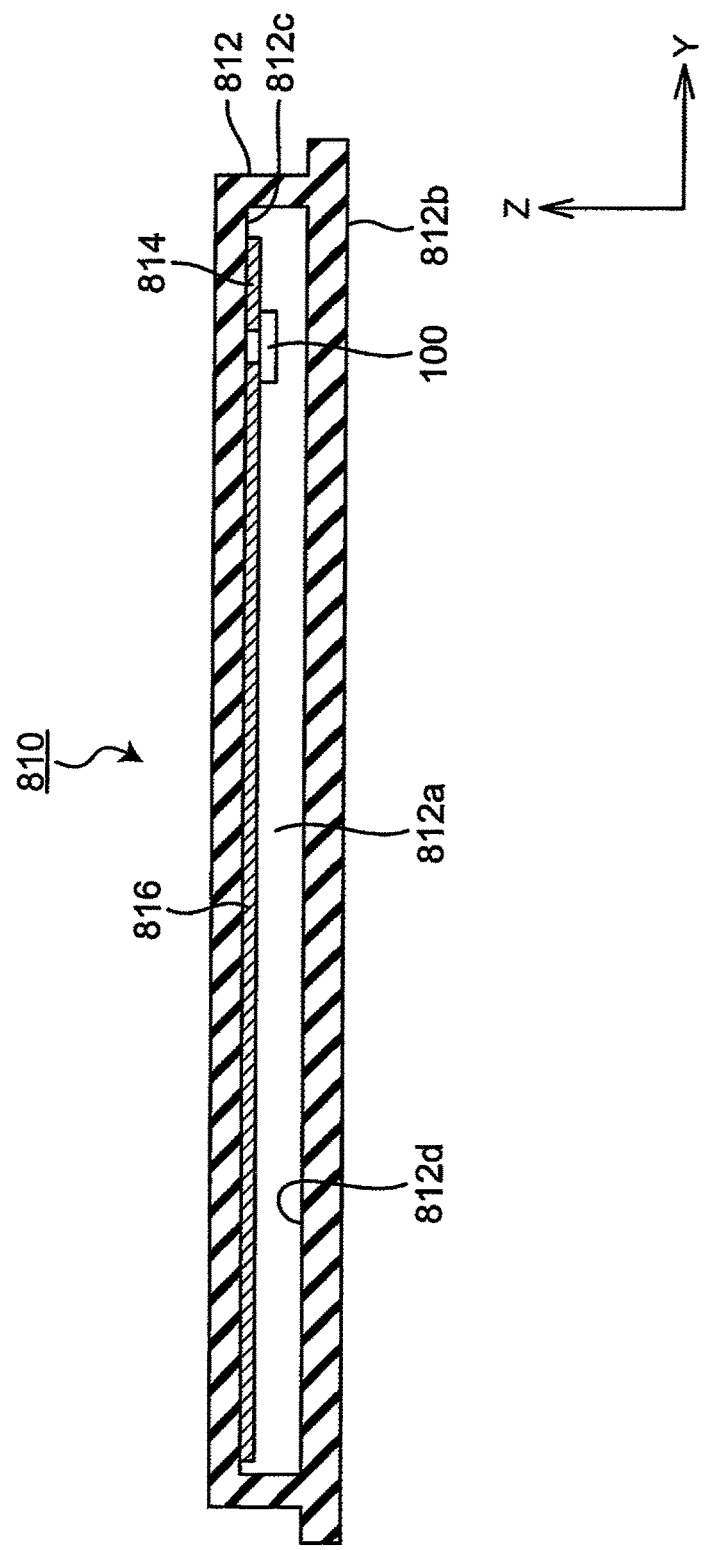
FIG. 21 is a cross-sectional view of a yet further exemplary wireless communication device.

A dielectric member 812 of a wireless communication device 810 shown in FIG. 21 includes an internal space 812a and an attachment surface 812b attached to a metal surface of an article. First and second radiation electrodes 814, 816 are attached to a top surface 812c of the internal space 812a (an inner surface far from the attachment surface 812b). Therefore, the first and second radiation electrodes 814, 816 are opposite to the metal surface of the article attached to the attachment surface 812b, via an air layer of the internal space 812a and the dielectric member 812 (a portion between the internal space 812a and the attachment surface 812b). Through the air layer, the stray capacitance can be made smaller between the first/second radiation electrodes 814, 816 and the metal surface of the article. As a result, an increase in the stray capacitance between the first/second radiation electrodes 814, 816 and the metal surface of the article due to thinning can be offset by the internal space 812a.

Moreover, a conductive layer may be disposed on a floor surface of the internal space of the dielectric member 812 (an inner surface close to the attachment surface 812b). As a result, regardless of what metal surface of the article the attachment surface 812b is attached to, the stray capacitance between the first/second radiation electrodes 814, 816 and the conductive layer is uniform, so that the wireless communication device can exhibit uniform communication characteristics.

An improved form of the wireless communication device 810 shown in FIG. 21 can be implemented as a form in which a portion of the dielectric member 812 does not exist between the first/second radiation electrodes 814, 816 and the metal surface of the article. In particular, the dielectric member 812 is formed into a cap shape (bottomed cylindrical shape), and an opening edge thereof functions as the attachment surface 812b. In this case, only the air layer exists between the first and second radiation electrodes and the metal surface of the article, so that the stray capacitance therebetween can further be reduced. Consequently, the wireless communication device can further be thinned.

Furthermore, according to the exemplary embodiment described above, for example, the wireless communication device 10 shown in FIG. 1, the first and second radiation electrodes 14, 16 and the RFIC element 100 are disposed on the principal surface 12a of the dielectric member 12. However, exemplary embodiments of the present disclosure are not limited thereto. For example, the first and second radiation electrodes and the RFIC element may be built into the dielectric member.

Furthermore, in the case of the exemplary embodiment described above, the wireless communication device 10 has flexibility so as to be attachable not only to a flat surface but also to a curved surface. However, exemplary embodiments of the present disclosure are not limited thereto. For example, the wireless communication device may have a flat plate shape including a flat surface, or may have a curved plate shape including a curved surface, without flexibility.

Additionally, the wireless communication device may be configured to expand a band of communication signal frequency (i.e., resonance frequency) so as to enhance the versatility.

Figure 22:
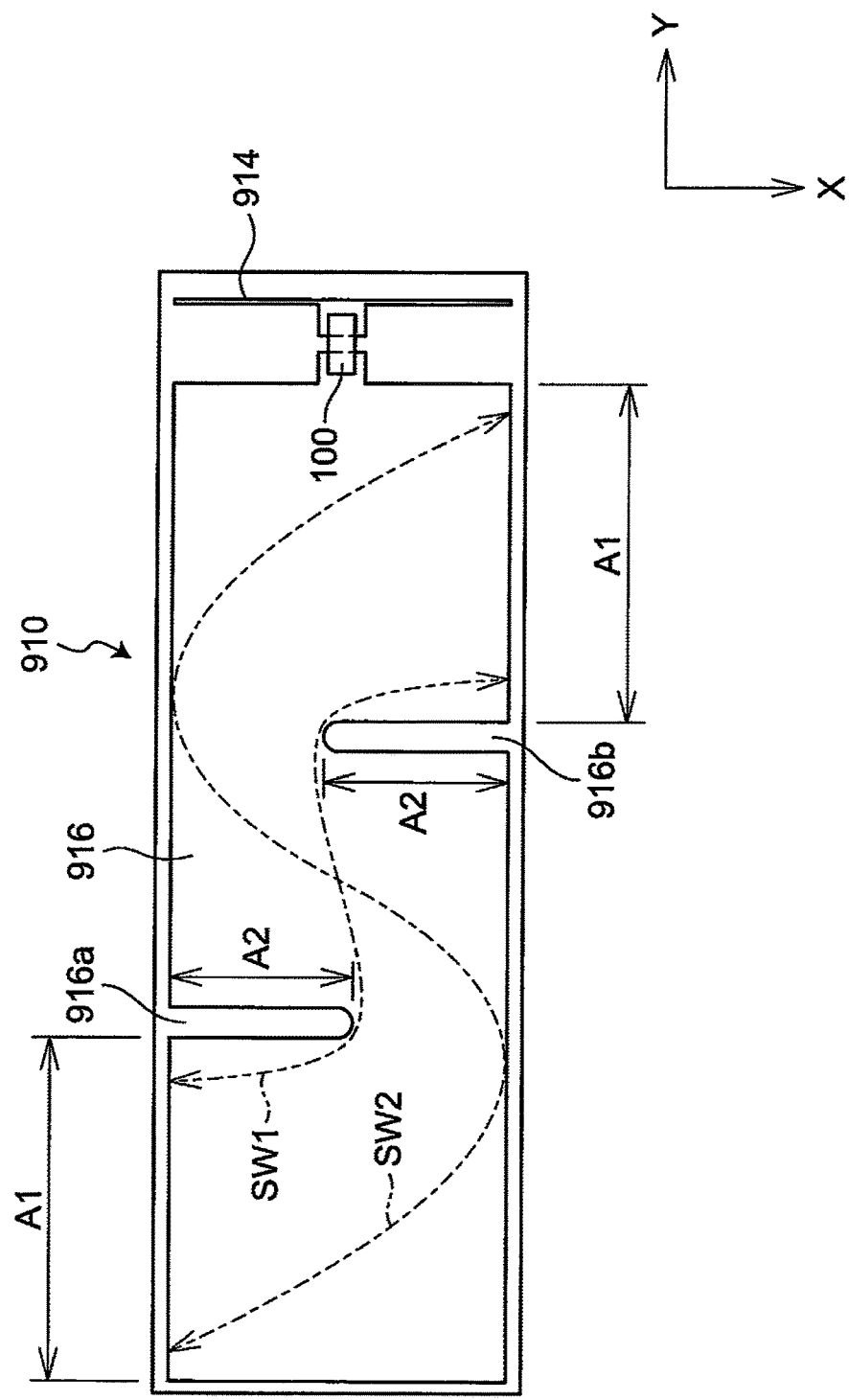
FIG. 22 is a top view of a wireless communication device according to a yet further exemplary embodiment.

FIG. 22 shows a wireless communication device configured to expand the resonance frequency band.

As described in the embodiment, the resonance frequency of a wireless communication module 910 is determined by a second radiation electrode 916. In the case of this embodiment, multiple notches 916a, 916b are formed in the second radiation electrode 916 so as to expand the resonance frequency band of the wireless communication device 910.

Specifically, the second radiation electrode 916 includes the first notch 916a disposed at one end in the width direction (X-axis direction) and extending toward the center (or beyond the center) in the width direction. The electrode also includes the second notch 916b disposed at the other end in the width direction and extending toward the center (or beyond the center) in the width direction.

The first notch 916a and the second notch 916b have a shape of a slit (a recess elongated in the width direction), for example. The first notch 916a and the second notch 916b are arranged at an interval in the length direction (Y-axis direction). Furthermore, in the case of this embodiment, a distance between the first notch 916a and one end (the end far from a first radiation electrode 914) of the second radiation electrode 916 in the length direction and a distance between the second notch 916b and the other end of the second radiation electrode 916 in the length direction are the same A1. Furthermore, the lengths of the first notch 916a and the second notch 916b in the width direction are the same A2.

Figure 23:
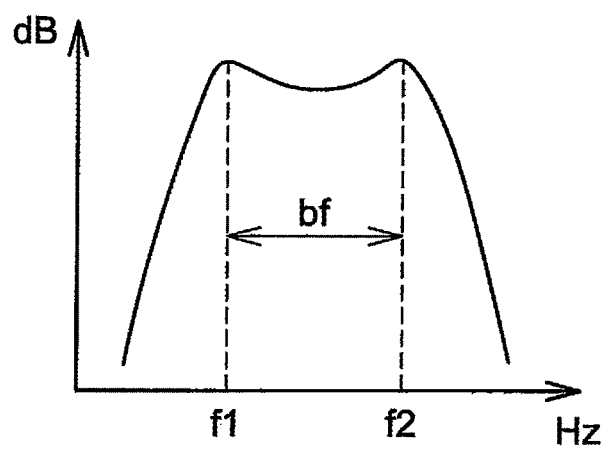
FIG. 23 is a diagram of frequency characteristics of a communication signal of the wireless communication device shown in FIG. 22.

According to the second radiation electrode 916 having such a configuration, the wireless communication device 910 has frequency characteristics shown in FIG. 23. Specifically, as shown in FIG. 23, the device has the frequency characteristics with a high antenna gain in a wide bandwidth bf between frequencies f1 (e.g., 860 MHz) and f2 (e.g., 930 MHz).

The bandwidth bf shown in FIG. 23 is determined by the distance A1 shown in FIG. 22. Specifically, as shown in FIG. 22, in the second radiation electrode 916, two different resonance modes occur (two different standing waves SW1, SW2 are generated). In particular, the standing wave SW1 having the shortest wavelength and the frequency of f2 is generated in the second radiation electrode 916. The standing wave SW2 having the maximum wavelength and the frequency of f1 is also generated in the second radiation electrode 1524. Due to coupling of the resonance mode in which the standing wave SW1 is generated and the resonance mode in which the standing wave SW2 is generated, the frequency band of the communication signal is expanded. The bandwidth bf is proportional to the distance A1 shown in FIG. 22. Therefore, by appropriately setting the distance A1, the desired bandwidth bf of the resonance frequency can be acquired. For the lower limit frequency f1 and the upper limit frequency f2 of the resonance frequency band, desired values can be acquired by appropriately setting the lengths (in the X-axis direction) of the first and second notches 916a, 916b. Consequently, the wireless communication device 910 has an expanded band of the communication signal frequency (i.e., the resonance frequency) and can be used for various applications (the versatility is enhanced).

In the case of the wireless communication device 910 shown in FIG. 22, the second radiation electrode 916 has the one first notch portion 916a disposed at one end in the width direction (X-axis direction) and the one second notch 916b disposed at the other end. Alternatively, for example, the multiple first notches 916a may be disposed and the multiple second notches 916b may be disposed. In this case, the multiple first notches 916a and the multiple second notches 916b are alternately arranged at equal intervals in the length direction (Y-axis direction) of the second radiation electrode 916. Alternatively, for example, only the one first notch 916a or only the one second notch 916b may be disposed in the second radiation electrode 916.

Additionally, the wireless communication device according to exemplary embodiments of the present disclosure is not limited to being used for transmission/reception of a signal of a frequency in the UHF band and is usable for transmitting/receiving signals of frequencies in various bands. The wireless communication device according to exemplary embodiments may be used for transmitting/receiving a signal of a frequency of the HF band, for example.

Lastly, although the wireless communication device according to the exemplary embodiments of the present disclosure has been described as a device attached to the metal surface of the article in the above description, it is contemplated that the device is capable of wireless communication even without being attached to the metal surface of the article, or moreover, even alone without being attached to an article. Therefore, the wireless communication device according to the exemplary embodiments described above is a wireless communication device capable of performing wireless communication, even when attached to a metal surface of an article, at substantially the same communication distance as when the device is not attached to an article.

Although the present invention has been described with a plurality of exemplary embodiments, it should be understood to those skilled in the art that at least one embodiment can entirely or partially be combined with a certain embodiment to form additional embodiment according to the present disclosure.

The present invention is applicable to any wireless communication device having an electrode radiating a radio wave and a dielectric member supporting the electrode.

EXPLANATIONS OF LETTERS OR NUMERALS 10 wireless communication device
12 dielectric member
12b attachment surface
14 first radiation electrode
16 second radiation electrode
100 RFIC element
G article
Ga metal surface

The invention claimed is:

1. A wireless communication device configured to be attached to a metal surface of an article, the wireless communication device comprising:
   a dielectric member having an attachment surface configured to be attached to the metal surface of the article;
   an RFIC element including first and second terminal electrodes;
   a first radiation electrode disposed on the dielectric member in parallel with and opposite to the metal surface of the article at a predetermined distance when the wireless communication device is attached to the article, the first radiation electrode being connected to the first terminal electrode of the RFIC element; and
   a second radiation electrode disposed on the dielectric member in parallel with and opposite to the metal surface of the article at the predetermined distance when the wireless communication device is attached to the article, the second radiation electrode being connected to the second terminal electrode of the RFIC element and not directly in contact with the first radiation electrode,
   wherein the first and second radiation electrodes extend in respective directions that intersect with each other,
   wherein each of the first and second radiation electrodes has a width and length that is greater than the width, respectively, and
   wherein the width and length of first radiation electrode are shorter than the width and length, respectively, of the second radiation electrode.

2. The wireless communication device according to claim 1, further comprising a conductive layer disposed on the attachment surface of the dielectric member and not physically connected to the first and second radiation electrodes.

3. The wireless communication device according to claim 1, wherein the length of the first radiation electrode equal to the width of the second radiation electrode.

4. The wireless communication device according to claim 3, wherein the length of the first radiation electrode and the width of the second radiation electrode extend in a same direction.

5. The wireless communication device according to claim 1, wherein the second radiation electrode includes a current concentration portion in which an area of a cross section orthogonal to a widthwise direction of the wireless communication device is smaller than other portions of the second radiation electrode.

6. The wireless communication device according to claim 5, wherein the second radiation electrode includes a first notch disposed at one end in a width direction of the second radiation electrode and that extends toward a center in the width direction.

7. The wireless communication device according to claim 6,
   wherein the second radiation electrode has a second notch disposed at the other end in the width direction and that extends toward the center in the width direction, and
   wherein the first notch and the second notch are arranged at interval in a length direction of the second radiation electrode.

8. The wireless communication device according to claim 1,
   wherein the RFIC element includes a first coil connected to the first terminal electrode and a second coil connected to the second terminal electrode,
   wherein the first radiation electrode includes a first land connected to the first terminal electrode,
   wherein the second radiation electrode includes a second land connected to the second terminal electrode, and
   wherein, when viewed from the metal surface, the first coil overlaps with the first land and the second coil overlaps with the second land.

9. The wireless communication device according to claim 1, wherein the dielectric member includes recesses at positions facing respective corner of the first and second radiation electrodes.

10. The wireless communication device according to claim 1, wherein the predetermined distance is between 0.2 mm and 1.0 mm.

11. An article for performing wireless communication, the article comprising:

a metal surface; and a wireless communication device attached to the metal surface and including:
- a dielectric member having an attachment surface attached to the metal surface,
- an RFIC element including first and second terminal electrodes;
- a first radiation electrode disposed on the dielectric member in parallel with and opposite to the metal surface at a predetermined distance and connected to the first terminal electrode of the RFIC element; and
- a second radiation electrode disposed on the dielectric member in parallel with and opposite to the metal surface of the article at the predetermined distance and connected to the second terminal electrode of the RFIC element, the second radiation electrode not directly in contact with the first radiation electrode, wherein the first and second radiation electrodes extend in respective directions that intersect with each other, wherein each of the first and second radiation electrodes has a width and length that is greater than the width, respectively, and wherein the width and length of the first radiation electrode are shorter than the width and length, respectively, of the second radiation electrode.

12. The article according to claim 11, further comprising a conductive layer disposed on the attachment surface of the dielectric member and not physically connected to the first and second radiation electrodes.

13. The article according to claim 11, wherein the length of the first radiation electrode equal to the width of the second radiation electrode and the length of the first radiation electrode and the width of the second radiation electrode extend in a same direction.

14. The article according to claim 11, wherein the second radiation electrode includes a current concentration portion in which an area of a cross section orthogonal to a widthwise direction of the wireless communication device is smaller than other portions of the second radiation electrode.

15. The article according to claim 14,
wherein the second radiation electrode includes a first notch disposed at one end in a width direction of the second radiation electrode and that extends toward a center in the width direction,
wherein the second radiation electrode has a second notch disposed at the other end in the width direction and that extends toward the center in the width direction, and
wherein the first notch and the second notch are arranged at interval in a length direction of the second radiation electrode.

16. The article according to claim 11,
wherein the RFIC element includes a first coil connected to the first terminal electrode and a second coil connected to the second terminal electrode,
wherein the first radiation electrode includes a first land connected to the first terminal electrode,
wherein the second radiation electrode includes a second land connected to the second terminal electrode, and
wherein, when viewed from the metal surface, the first coil overlaps with the first land and the second coil overlaps with the second land.

17. The article according to claim 11, wherein the dielectric member includes recesses at positions facing respective corner of the first and second radiation electrodes.

18. The article according to claim 11, wherein the predetermined distance is between 0.2 mm and 1.0 mm.

19. A wireless communication device comprising:
- a dielectric member having first and second surfaces that oppose each other, with the first surface being configured to be attached to a metal surface of the article;
- an RFIC element including first and second terminal electrodes;
- a first radiation electrode disposed on the second surface of the dielectric member and connected to the first terminal electrode of the RFIC element; and
- a second radiation electrode disposed on the second surface of the dielectric member in a same plane as the first radiation electrode and connected to the second terminal electrode of the RFIC element independently of the first radiation electrode, wherein each of the first and second radiation electrodes has a width and length that is greater than the width, respectively, and wherein the width and length of first radiation electrode are shorter than the width and length, respectively, of the second radiation electrode.

20. The wireless communication device according to claim 19, further comprising a conductive layer disposed on the first surface of the dielectric member and not physically connected to the first and second radiation electrodes.

* * * * *